US008596395B2

(12) United States Patent
Hirano

(10) Patent No.: US 8,596,395 B2
(45) Date of Patent: Dec. 3, 2013

(54) IN-WHEEL MOTOR DRIVE DEVICE

(75) Inventor: Takahisa Hirano, Anjo (JP)

(73) Assignee: Aisin Aw Co., Ltd., Anjo (JP)

( * ) Notice: Subject to any disclaimer, the term of this patent is extended or adjusted under 35 U.S.C. 154(b) by 0 days.

(21) Appl. No.: 13/404,315

(22) Filed: Feb. 24, 2012

(65) Prior Publication Data

US 2012/0248850 A1    Oct. 4, 2012

(30) Foreign Application Priority Data

Mar. 28, 2011 (JP) ................................ 2011-069328
Jul. 28, 2011 (JP) ................................ 2011-165778

(51) Int. Cl.
*B60K 1/00* (2006.01)

(52) U.S. Cl.
USPC ...................................... 180/65.51; 301/6.91

(58) Field of Classification Search
USPC ........... 180/65.31, 65.51, 65.6, 65.7; 301/6.5, 301/6.91
See application file for complete search history.

(56) References Cited

U.S. PATENT DOCUMENTS

| 7,350,605 | B2* | 4/2008 | Mizutani et al. ........... | 180/65.51 |
| 7,641,010 | B2* | 1/2010 | Mizutani et al. ........... | 180/65.51 |
| 7,703,780 | B2* | 4/2010 | Mizutani et al. ........... | 280/124.1 |
| 2007/0068715 | A1* | 3/2007 | Mizutani et al. ............ | 180/65.5 |
| 2008/0223638 | A1 | 9/2008 | Niwa | |
| 2011/0115343 | A1 | 5/2011 | Walser et al. | |
| 2012/0248850 | A1* | 10/2012 | Hirano ........................... | 301/6.5 |

FOREIGN PATENT DOCUMENTS

| JP | A-2004-90822 | 3/2004 |
| JP | A-2004-168211 | 6/2004 |
| JP | A-2005-199879 | 7/2005 |
| JP | A-2007-269209 | 10/2007 |
| JP | A-2008-168742 | 7/2008 |
| JP | A-2008-184110 | 8/2008 |
| JP | A-2008-184111 | 8/2008 |
| JP | A-2008-184140 | 8/2008 |
| JP | A-2009-012523 | 1/2009 |
| JP | A-2009-25140 | 2/2009 |
| JP | A-2009-90923 | 4/2009 |
| JP | A-2009-126189 | 6/2009 |
| WO | WO 2009/124892 A2 | 10/2009 |

OTHER PUBLICATIONS

International Search Report issued in International Patent Application No. PCT/JP2012/055035 dated May 29, 2012 (with translation).

* cited by examiner

*Primary Examiner* — John Walters
*Assistant Examiner* — James Triggs
(74) *Attorney, Agent, or Firm* — Oliff & Berridge, PLC

(57) ABSTRACT

An in-wheel motor drive device is attached to an inner side of a wheel of a vehicle wheel and drives the vehicle wheel. The in-wheel motor drive device includes a rotating electric machine; a transmission mechanism that transmits the rotation of the rotating electric machine; a speed reducing mechanism that reduces in speed the rotation transmitted by the transmission mechanism; and an output shaft that outputs the reduced-speed rotation of the speed reducing mechanism to the wheel. The speed reducing mechanism and the output shaft are disposed on a first axis coaxial with a center of the wheel. The rotating electric machine is disposed on a second axis parallel to the first axis, and the rotating electric machine and the speed reducing mechanism are positioned in a radial cross section perpendicular to the first axis and the second axis.

20 Claims, 12 Drawing Sheets

US 8,596,395 B2

IN-WHEEL MOTOR DRIVE DEVICE

INCORPORATION BY REFERENCE

The disclosure of Japanese Patent Application Nos. 2011-069328 and 2011-165778 filed on Mar. 28, 2011 and Jul. 28, 2011, respectively, including the specifications, drawings and abstracts are incorporated herein by reference in their entirety.

BACKGROUND OF THE INVENTION

The present invention relates to an in-wheel motor drive device that is mounted in a hybrid vehicle, an electric vehicle, or the like. More specifically, the present invention relates to an in-wheel motor drive device that includes a rotating electric machine, and a speed reducing mechanism that reduces in speed the rotation of the rotating electric machine.

DESCRIPTION OF THE RELATED ART

Various vehicles mounted with a motor-generator (referred to simply as a "motor" below) such as hybrid vehicles and electric vehicles have been proposed in recent years with the aim of realizing vehicles with better fuel economy and environmental performance. With respect to vehicles mounted with such motors, development on in-wheel motor drive devices provided inside the wheel of a vehicle wheel has been progressing to secure more vehicle cabin space, improve driving-regenerating efficiency, as well as reduce size by omitting the axle shaft and differential device (see Japanese Patent Application Publication Nos. JP-A-2009-126189 and JP-A-2009-12523).

SUMMARY OF THE INVENTION

However, disposing the motor (traction motor 20) and the speed reducing mechanism (speed reducer 30) coaxial with the center axis of the wheel as described in JP-A-2009-126189 increases the axial length of the device, and the motor projects outward considerably more than the wheel width and intrudes into the vehicle side as a consequence. Such intrusion of the motor into the vehicle side would interfere with the suspension device in a vehicle that does not have the in-wheel motor drive device, thus necessitating the development of a new suspension device in order to install the in-wheel motor drive device, which in addition to affecting vehicle design, risks a significant cost increase.

In order to shorten the axial length of the device of JP-A-2009-126189, the motor diameter may be increased and the motor disposed so as to encompass the outer peripheral side of the speed reducing mechanism. However, this would also increase the radial length of the overall in-wheel motor drive device, which may similarly cause the in-wheel motor drive device to interfere with the brake device disposed inside the wheel.

JP-A-2009-12523 proposes a device in which the motor (22) is disposed offset on a shaft separate from the center shaft of the wheel (12). However, the device of JP-A-2009-12523 disposes a planetary gear mechanism (32) that reduces in speed the rotation of the motor (22) coaxial with the center shaft (drive connection shaft 25) of the wheel (12), and circumferentially outward of the drive connection shaft (35). This consequently increases the pitch circle diameter (PCD: distance between the center points of opposing hub bolt holes) of the hub bolts (14) that fix the hub to the wheel, and requires a special wheel, which may reduce the versatility of the wheel.

Hence, it is an object of the present invention to provide an in-wheel motor drive device that does not interfere with a suspension device and a brake device, and has improved vehicle mountability.

The present invention (e.g., see FIGS. 1 to 12) is an in-wheel motor drive device that is attached to an inner side of a wheel of a vehicle wheel and drives the vehicle wheel. The in-wheel motor drive device includes: a rotating electric machine; a transmission mechanism that transmits the rotation of the rotating electric machine; a speed reducing mechanism that reduces in speed the rotation transmitted by the transmission mechanism; and an output shaft that outputs the reduced-speed rotation of the speed reducing mechanism to the wheel. The speed reducing mechanism and the output shaft are disposed on a first axis coaxial with a center of the wheel. The rotating electric machine is disposed on a second axis parallel to the first axis. The rotating electric machine and the speed reducing mechanism are positioned in a radial cross section perpendicular to the first axis and the second axis.

Thus, the rotating electric machine is disposed on the second axis parallel to the first axis, the rotating electric machine and the speed reducing mechanism are positioned in a radial cross section perpendicular to the first axis and the second axis. It is thus possible to prevent the rotating electric machine from intruding into the vehicle side, and an increase in the radial length of the overall in-wheel motor drive device. In addition, the in-wheel motor drive device can also be prevented from interfering with a suspension device and a brake device. Therefore, no significant design changes are required of the suspension device and the brake device, and the in-wheel motor drive device has improved vehicle mountability.

In addition, an increase in the PCD of hub bolts caused by disposing the speed reducing mechanism circumferentially inward of a wheel hub, for example, can be prevented, and the PCD of the hub bolts can thus be set to a more versatile size. Therefore, the use of a special wheel or the like is not necessary, and a common wheel can be attached without modification to the wheel hub.

In the present invention (e.g., see FIGS. 2, 3, 7, and 8), the rotating electric machine may be disposed around the first axis at a position different in the circumferential direction from a caliper of a disc brake device attached to the inner side of the wheel of the vehicle wheel.

Thus, the rotating electric machine is disposed around the first axis at a position different in the circumferential direction from the caliper of the disc brake device. Therefore, the rotating electric machine and the caliper are not provided aligned in the axial direction, and the rotating electric machine and the caliper can be disposed on the inner side of the wheel without interfering with each other, which prevents an increase in the axial length of the in-wheel motor drive device.

Specifically, the present invention (e.g., see FIG. 2) may further include a case. The case may include: a first cylinder portion that accommodates the speed reducing mechanism and a portion of the output shaft, and is formed into a cylindrical shape around the first axis; and a second cylinder portion that accommodates the rotating electric machine, and is formed into a cylindrical shape around the second axis and such that respective outer walls of the first cylinder portion and the second cylinder portion partially overlap. In addition, the second cylinder portion may be disposed offset toward one side with respect to a vertical line perpendicular at the first axis to a horizontal line that passes through the first axis.

The case may further include, on an outer surface on the other side with respect to the vertical line, a caliper fixing portion that fixes the caliper.

Thus, the second cylinder portion of the case is disposed offset toward the one side with respect to the vertical line perpendicular at the first axis to the horizontal line that passes through the first axis. The caliper fixing portion that fixes the caliper is provided on the outer surface of the second cylinder portion on the other side with respect to the vertical line of the case. Therefore, the rotating electric machine and the caliper can be disposed on the outer circumferential side of the first cylinder portion of the case at different positions in the circumferential direction. Thus, the rotating electric machine and the caliper are not provided aligned in the axial direction, and the rotating electric machine and the caliper can be disposed on the inner side of the wheel without interfering with each other.

The present invention (e.g., see FIG. 2) may further include a case. The case may include: a first cylinder portion that accommodates the speed reducing mechanism and a portion of the output shaft, and is formed into a cylindrical shape around the first axis; and a second cylinder portion that accommodates the rotating electric machine, and is formed into a cylindrical shape around the second axis and such that respective outer walls of the first cylinder portion and the second cylinder portion partially overlap. In addition, the second cylinder portion may be disposed offset toward one side with respect to a vertical line perpendicular at the first axis to a horizontal line that passes through the first axis. The case may further include, on the one side with respect to the vertical line and lower than the second cylinder portion, a suspension fixing portion that is fixed to a suspension device.

Thus, the second cylinder portion of the case is disposed offset toward the one side with respect to the vertical line perpendicular at the first axis to the horizontal line that passes through the first axis. The suspension fixing portion fixed to the suspension device is provided on the one side with respect to the vertical line of the case and lower than the second cylinder portion. Therefore, the rotating electric machine and an attachment arm of the suspension device can be disposed on the outer circumferential side of the first cylinder portion of the case at different positions in the circumferential direction. Thus, the rotating electric machine and the suspension device can be disposed without interfering with each other.

Specifically, in the present invention (e.g., see FIGS. 1 to 5, and 10 to 12), the case may include: a case main body that includes a bearing support portion that supports a bearing that rotatably supports the output shaft, accommodates at least the rotating electric machine and the speed reducing mechanism, and opens toward a side in the axial direction opposite from the bearing support portion; and a cover member that closes the opening of the case main body. In addition, the suspension fixing portion may be provided integrally extending from the case main body.

Thus, the suspension fixing portion is also provided integrally extending from the case main body. Therefore, the vehicle wheel can be supported by the suspension device without involving the cover member. Thus, because the supporting force for the vehicle wheel is not transmitted to the cover member, there is no need to increase the thickness of the cover member or strengthen a fastened section between the cover member and the case main body. As a consequence, the in-wheel motor drive device can be made more compact in the axial direction and reduced in weight.

The present invention (e.g., see FIGS. 6 to 9) may further include a case that accommodates at least the rotating electric machine and the speed reducing mechanism. In addition, the case may be fixed to a joining portion of a suspension device that passes below the case and joins to a bearing that rotatably supports the output shaft.

Thus, the case is fixed to the joining portion of the suspension device by the suspension device passing below the case and joining with the hub bearing that rotatably supports the output shaft. Therefore, the vehicle wheel can be supported by the suspension device without involving the case. Thus, because the supporting force for the vehicle wheel is not transmitted to the case, there is no need to increase the thickness of the case or strengthen a fastened section between the case and the joining portion of the suspension device. As a consequence, the in-wheel motor drive device can be made more compact and reduced in weight.

In the present invention (e.g., see FIGS. 2, 3, 5, 7, 8, and 12), the second axis on which the rotating electric machine is provided may be disposed higher than the first axis.

Thus, the second axis on which the rotating electric machine is provided is also disposed higher than the first axis, that is, the rotating electric machine is disposed higher than the center of the wheel. Therefore, a layout structure effective against flooding and muddying of the rotating electric machine can be achieved. In addition, if oil (lubrication oil) is sealed inside the case of the in-wheel motor drive device, the rotation of the rotating electric machine can be prevented from agitating the reservoir of oil accumulated on the lower side of the case. As a consequence, loss in the rotating electric machine from oil agitation can be reduced, and the fuel consumption (electricity consumption) of the vehicle can also be reduced.

In the present invention (e.g., see FIGS. 1, 6, 10, and 11), the speed reducing mechanism may be disposed parallel on the first axis to the bearing that rotatably supports the output shaft.

Thus, the speed reducing mechanism is disposed parallel on the first axis to the bearing that rotatably supports the output shaft. Therefore, an increase in the size of the diameter of the bearing caused by the speed reducing mechanism disposed on the inner circumferential side of the bearing can be prevented. As a consequence, the bearing can be set to a more versatile size. Thus, the diameter of the output shaft supported by the bearing can also be set to a more versatile size, whereby the wheel hub can be set to a more versatile size as well.

In the present invention (e.g., see FIGS. 11 and 12), the transmission mechanism may include: a first rotating body that is disposed on the first axis and drive-coupled to the speed reducing mechanism; a second rotating body that is disposed on the second axis and disposed offset toward a side of the first rotating body opposite from an output shaft side thereof in the axial direction, and drive-coupled to the rotating electric machine; and a counter member that is disposed on an axis parallel to the first axis and the second axis, disposed at a position that does not overlap with an outer diameter of the rotating electric machine, disposed in a radial cross section perpendicular to the first rotating body and the second rotating body so as to span between the first rotating body and the second rotating body, and drive-coupled to the first rotating body and the second rotating body.

Thus, the counter member is disposed at a position that does not overlap with the outer diameter of the rotating electric machine, and also disposed on the radial cross section perpendicular to the first rotating body and the second rotating body so as to span between the first rotating body and the second rotating body. In addition, the counter member is drive-coupled to the first rotating body and the second rotating body. Therefore, the length of the rotating electric machine in the axial direction can be expanded without moving the position of the first rotating body toward the vehicle body side. Thus, even if the in-wheel motor drive device is mounted in a vehicle in which the axial length of the first axis is restricted by a shock absorber, for example, the output performance of the rotating electric machine can be improved.

Specifically, in the present invention (e.g., see FIGS. 11 and 12), the transmission mechanism may further include an idler gear that is disposed on a third axis parallel to the first axis and the second axis and meshes with the second rotating body. In addition, the counter member may be disposed on a fourth axis parallel to the first axis and the second axis, and mesh with the first rotating body and the idler gear at different positions in the axial direction.

Thus, the counter member is disposed on the fourth axis parallel to the first axis and the second axis, and meshes at different positions in the axial direction with the first rotating body and the idler gear that meshes with the second rotating body. Therefore, the first rotating body and the second rotating body can be drive-coupled at different positions in the axial direction.

DETAILED DESCRIPTION OF THE EMBODIMENTS

First Embodiment

A first embodiment of the present invention will be described below with reference to FIGS. 1 to 5. First, an in-wheel motor drive device according to the present invention, and the structure of a vehicle wheel provided with the in-wheel motor drive device will be described with reference to FIGS. 1 and 2. Note that an in-wheel motor drive device $1_1$ of the present embodiment is used as a drive device that is attached to inside a wheel of a rear vehicle wheel of a front-wheel-drive hybrid vehicle, and changes the vehicle to a four-wheel-drive mode. In addition to this, the in-wheel motor drive device $1_1$ of the present embodiment may also be used, for example, as a drive device for an electric vehicle, a drive device for a series type of hybrid vehicle, or a drive device that is attached to inside a wheel of a front vehicle wheel of a rear-wheel-drive hybrid vehicle and changes the vehicle to a four-wheel-drive mode.

Figure 1:
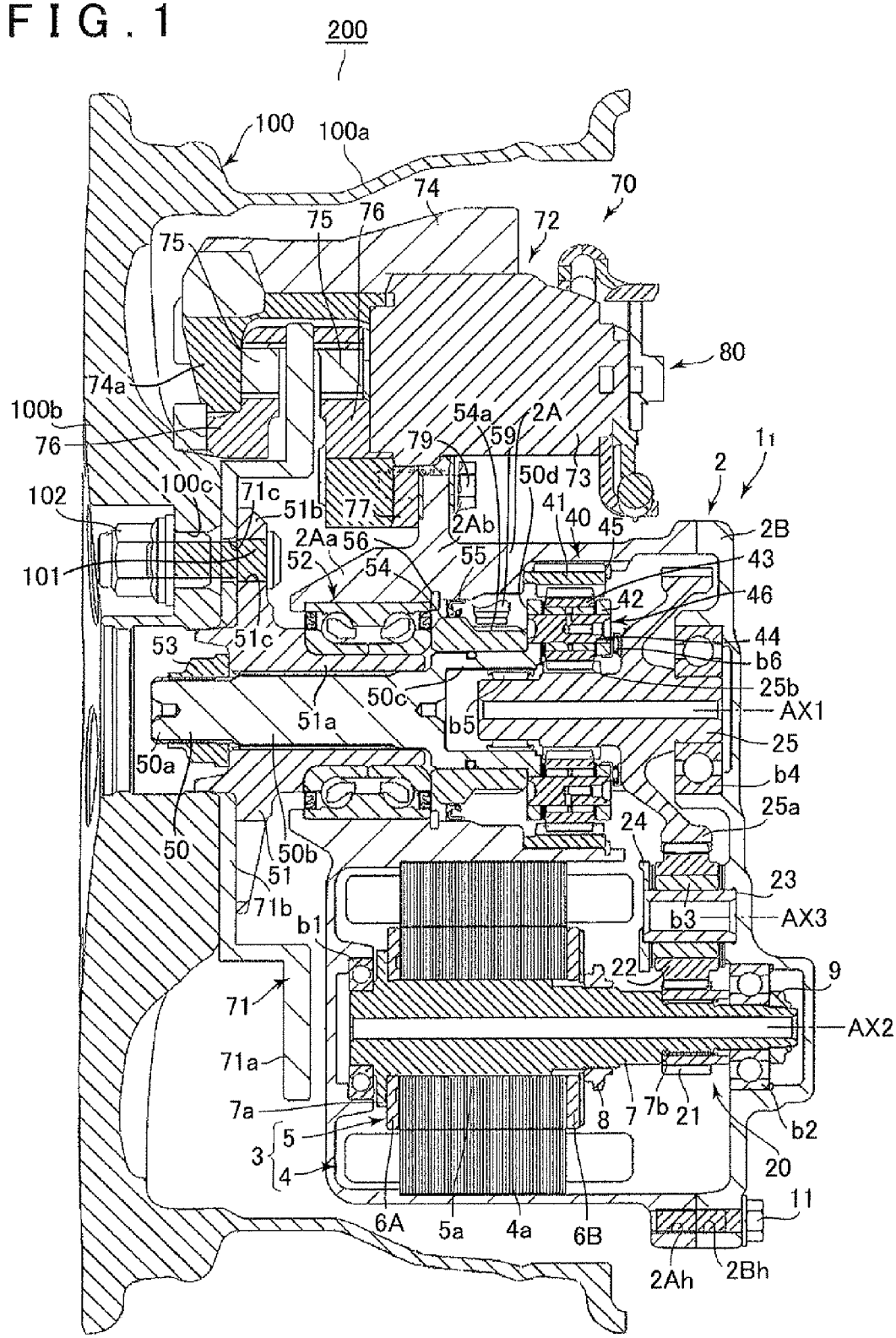
FIG. 1 is a cross-sectional view that shows a vehicle wheel provided with an in-wheel motor drive device according to a first embodiment.

As shown in FIG. 1, the in-wheel motor drive device $1_1$ is generally configured to include, inside a case 2, a motor-generator (rotating electric machine) 3, a speed reducing gear mechanism (transmission mechanism) 20, a speed reducing planetary gear (speed reducing mechanism) 40, and an output shaft 50 to which a wheel hub 51 is fixed. More specifically, the output shaft 50 and the speed reducing planetary gear 40 among the above are disposed on a first axis AX1 coaxial with the center of a wheel 100 described later, the speed reducing gear mechanism 20 is disposed such that a transmission path extends in a direction perpendicular to the axial direction, and the motor-generator 3 (referred to simply as a "motor 3" below) is disposed on a second axis AX2 parallel to the first axis AX1. Thus, the transmission path formed by the motor 3, the speed reducing gear mechanism 20, the speed reducing planetary gear 40, and the output shaft 50 is configured to have a C shape in a cross-sectional view.

That is, the motor 3 and the speed reducing planetary gear 40 are disposed so as to be positioned in a radial cross section perpendicular to the first axis AX1 and the second axis AX2, i.e., there is at least one radial cross section that passes through the motor 3 and the speed reducing planetary gear 40 and is also perpendicular to the first axis AX1 and the second axis AX2. In other words, at least a portion of the motor 3 and at least a portion of the speed reducing planetary gear 40 are disposed at positions that overlap in the axial direction when viewed from the radial direction. As shown in FIG. 1, the entire speed reducing planetary gear 40 is preferably disposed at a position that overlaps in the axial direction with the motor 3 when viewed from the radial direction.

The case 2 is configured to include a main case (case main body) 2A that accommodates a majority of the essential parts, includes a bearing support portion 2Aa for a hub bearing 52 described in detail later, and opens toward a side in the axial direction opposite from the bearing support portion 2Aa; and a case cover (cover member) 2B that closes the opening of the main case 2A. The main case 2A and the case cover 2B are fastened together by bolts 11 that are threadedly engaged with holes 2Ah of the main case 2A and holes 2Bh of the case cover 2B.

Figure 2:
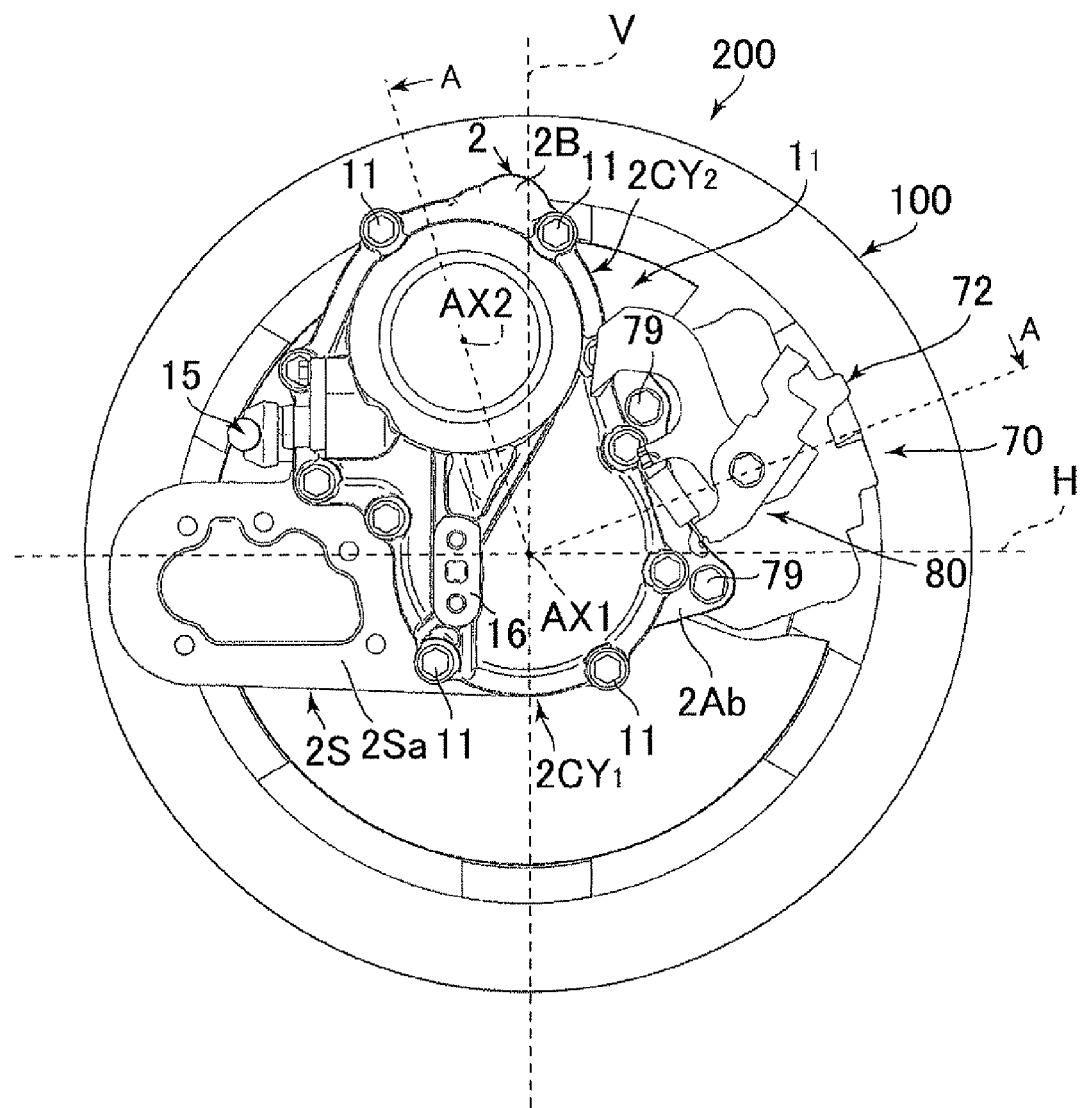
FIG. 2 is a side view that shows the vehicle wheel provided with the in-wheel motor drive device according to the first embodiment.

As shown in FIG. 2, in general terms, the case 2 can be seen as partially divided into a first cylinder portion $2CY_1$ and a second cylinder portion $2CY_2$. The first cylinder portion $2CY_1$ is formed into a cylindrical shape around the first axis AX1, and accommodates a speed reducing gear shaft 25 described later, the speed reducing planetary gear 40, and a portion of the output shaft 50. The second cylinder portion $2CY_2$ is formed into a cylindrical shape around the second axis AX2, and accommodates the motor 3. The first cylinder portion $2CY_1$ and the second cylinder portion $2CY_2$ have outer walls that partially overlap, and the first cylinder portion $2CY_1$ and the second cylinder portion $2CY_2$ together form a figure-eight in a side view. As shown in FIG. 1, the section where the outer walls overlap has a shape that forms a partition section between the motor 3 and the output shaft 50.

As shown in FIG. 2, the first axis AX1, i.e., the center of the first cylinder portion $2CY_1$ of the case 2, is coaxial with the center of the wheel 100, and the second axis AX2, i.e., the center of the second cylinder portion $2CY_2$ of the case 2, is disposed higher than the first axis AX1 in a vehicle mounted state. That is, the motor 3 is upwardly disposed among the in-wheel motor drive device 1$_1$. The second axis AX2 (the second cylinder portion $2CY_2$ of the case 2) is disposed offset toward one side in the circumferential direction (e.g., the forward side in the vehicle advancing direction) with respect to a vertical line V perpendicular at the first axis AX1 to a horizontal line H that passes through the first axis AX1. A caliper 72 of a disc brake device 70 described in detail later is disposed toward the other side in the circumferential direction (e.g., the reverse side in the vehicle advancing direction) with respect to the vertical line V. Thus, the motor 3 is disposed around the first axis AX1 at a position different in the circumferential direction from the caliper 72.

A suspension fixing portion 2S that attaches a suspension device 90 is disposed toward the one side in the circumferential direction with respect to the vertical line V and lower than the second cylinder portion $2CY_2$ of the case 2, and also provided in a form that integrally extends from the main case 2A. Thus, the caliper 72, the second cylinder portion $2CY_2$ of the case 2, and the suspension fixing portion 2S are disposed in counterclockwise order in FIG. 2 on the outer periphery of the first cylinder portion $2CY_1$ of the case 2, thereby achieving a layout structure with no mutual interference in the circumferential direction.

Note that the case 2 configures a hermetically-sealed structure with oil enclosed therein by using a seal ring 55 to seal the outer circumferential side of the output shaft 50 described in detail later. In other words, the case 2 accommodates the motor 3, the speed reducing gear mechanism 20, a resolver device 30, the speed reducing planetary gear 40, a portion of the output shaft 50, and the like. Moreover, the case 2 encloses oil to form therein an oil reservoir on the lower side of the ease 2. The oil reservoir is formed at a lower section than the first axis AX1 inside the first cylinder portion $2CY_1$ that is on the lower side. The speed reducing planetary gear 40 and a large diameter gear 25a of the speed reducing gear shaft 25 described later are partially immersed in the oil reservoir. The motor 3 is not immersed in the oil reservoir, and the motor 3 is lubricated and cooled by oil thrown up by the rotation of the speed reducing planetary gear 40 and the large diameter gear 25a. Because the motor 3 is not normally immersed in the oil reservoir, the motor 3 does not experience loss from oil agitation.

Next, the internal structure of the in-wheel motor drive device 1$_1$ will be described in detail with reference to FIG. 1. Note that the cross-sectional view of the in-wheel motor drive device 1$_1$ shown in FIG. 1 is a cross-sectional view as seen from the direction of arrows A-A in FIG. 2.

As described above, the upper section of the main case 2A is provided with the motor 3. The motor 3 is configured to include a stator 4 fixed to the case 2, and a rotor 5 fixed on a rotor shaft 7 that is rotatably supported by the case 2 on the second axis AX2. The motor 3 is formed from a so-called induction motor in which the rotor 5 is not embedded with permanent magnets. The stator 4 includes stator steel plates 4a that are formed by layering a plurality of steel plates and embedded with stator windings. A fixing portion (not shown) fastens the stator steel plates 4a to the case 2 by bolts or the like. Note that the wiring connected to the stator windings is connected to an inverter circuit (not shown) through a connector portion 15 (see FIG. 2) that is provided on a side surface of the second cylinder portion $2CY_2$ on the front side.

Meanwhile, the rotor 5 includes a cylindrical rotor core 5a formed by laminating steel plates similar to the stator steel plates 4a so as to generate an induction current, for example. Both sides of the rotor core 5a in the axial direction are respectively provided with annular end plates 6A, 6B. The end plate 6A is in contact with a flange portion 7a formed on the rotor shaft 7. The end plate 6B is fastened to the flange portion 7a by a nut 8 that is threadedly engaged with the rotor shaft 7. Thus, the rotor core 5a is integratedly and fixedly mounted on the rotor shaft 7.

The rotor 7 is rotatably supported by a ball bearing b1 fitted to an annular section of an inner surface of the main case 2A, and a ball bearing b2 fitted to an annular section of an inner surface of the case cover 2B so as to achieve a structure supported on two sides. On the rotor shaft 7, a small diameter gear 21 as the speed reducing gear mechanism 20 is in spline engagement with and unrotatable relative to the rotor shaft 7, and provided in a manner parallel to the rotor core 5a in the axial direction. The small diameter gear 21 and the ball bearing b2 are fastened to a stepped section 7b of the rotor shaft 7 by a nut 9.

The speed reducing gear mechanism 20 is configured to include the small diameter gear 21 fixedly mounted to the rotor shaft 7 as described above, an idler gear 22 that meshes with the small diameter gear 21, and the large diameter gear 25a of the speed reducing gear shaft 25 that meshes with the idler gear 22. The idler gear 22 is disposed on a third axis AX3 parallel to the first axis AX1 and the second axis AX2, and rotatably supported through a needle bearing b3 by an idler shaft 23. The idler shaft 23 is configured so as to achieve a structure supported on two sides by a hole section formed in the case cover 2B, and a hole portion of a support plate 24 fixedly supported by the case cover 2B.

The large diameter gear 25a of the speed reducing gear shaft 25 is disposed parallel on the first axis AX1 to the speed reducing planetary gear 40 and the output shaft 50. An outer circumferential surface of a section formed into a flange shape extending from the speed reducing gear shaft 25 is formed as a toothed surface that meshes with the idler gear 22 to configure the large diameter gear 25a as a gear. The speed reducing gear shaft 25 on the first axis AX1 is parallel to and lower than the rotor shaft 7 on the second axis AX2. The speed reducing gear shaft 25 has one end rotatably supported relative to the case 2 by a ball bearing b4, and another end that is rotatably supported relative to the case 2 by a needle bearing b5, namely, the output shaft 50 and the hub bearing 52 described later. The large diameter gear 25a transmits the rotation of the motor 3 through the idler gear 22 and the small diameter gear 21. In addition, on an outer circumferential surface of the speed reducing gear shaft 25 toward the output shaft 50 side in the axial direction, a toothed surface of a sun gear 25b of the speed reducing planetary gear 40 is formed.

Figure 5:
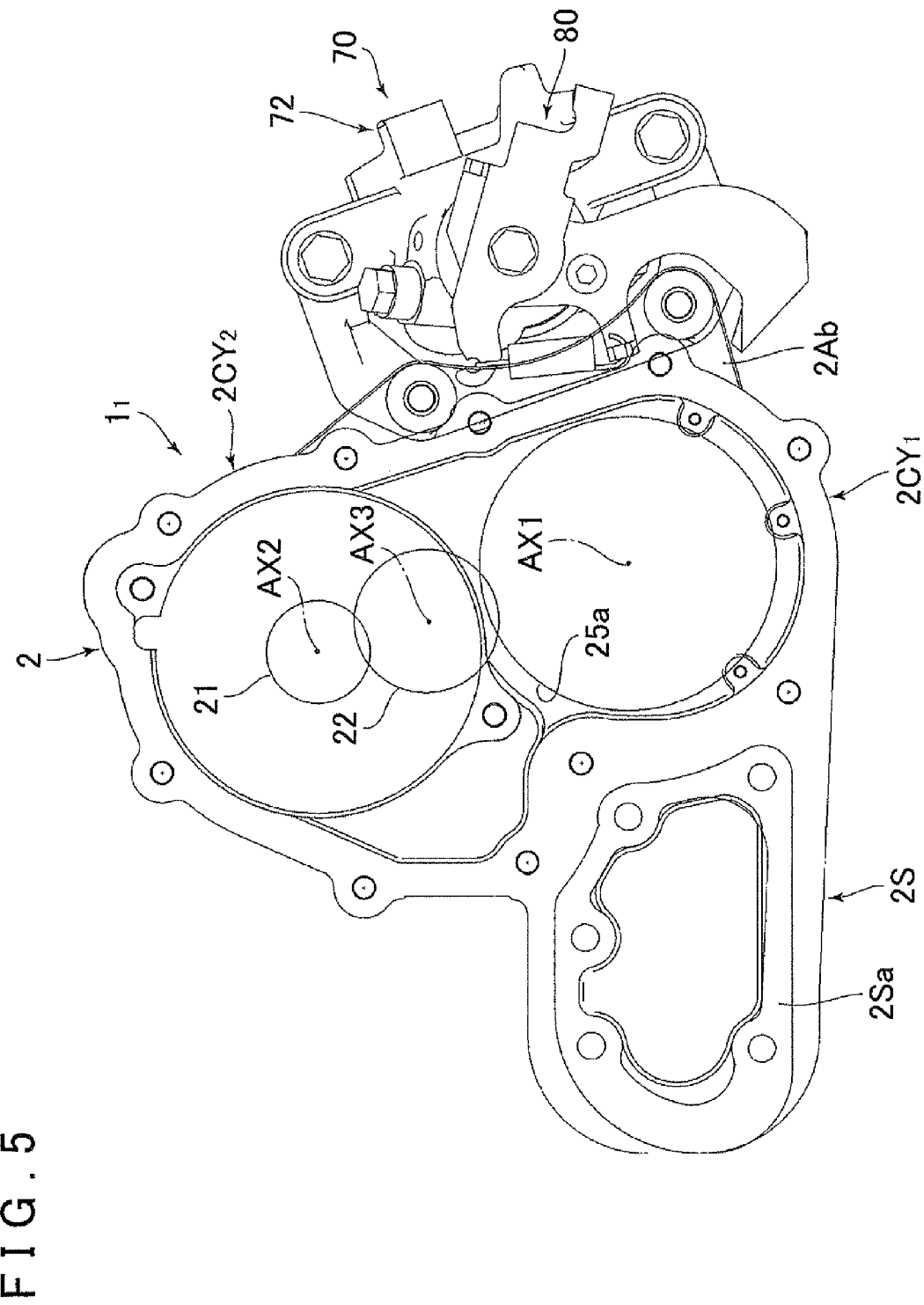
FIG. 5 is a schematic side view that shows the positional relationship of first to third axes of the in-wheel motor drive device according to the first embodiment.

Note that, as shown in FIG. 5 in a side view, the speed reducing gear mechanism 20 is disposed such that the respective centers of the small diameter gear 21, the idler gear 22, and the large diameter gear 25a (i.e., the axial centers of the first axis AX1, the second axis AX2, and the third axis AX3) are aligned, and as shown in FIG. 1 in the axial direction as well (in a frontal view), also disposed so as to align along the motor 3, the speed reducing planetary gear 40, and a side surface of the case cover 2B.

The speed reducing planetary gear 40 includes the sun gear 25b mentioned above, a pinion gear 43 that meshes with the sun gear 25b, and a ring gear 41 that meshes with the pinion gear 43. The pinion gear 43 is rotatably supported by a pinion shaft 44 that spans between a side plate 42 and a flange portion 50d of the output shaft 50. The pinion gear 43, the pinion shaft 44, the side plate 42, and the flange portion 50d configure an integrated carrier 46. The ring gear 41 is held between a snap ring 45 and the main case 2A, and in spline engagement with and unrotatably fixed to a cylinder section formed along an inner circumferential surface of the first cylinder portion $2CY_1$ in the main case 2A. Note that a thrust bearing b6 is provided between the large diameter gear 25a and the side plate 42 of the carrier 46 of the speed reducing planetary gear 40. The carrier 46 of the speed reducing planetary gear 40 is rotatably supported by the thrust bearing b6, and the axial position of the carrier 46 is positioned and supported by the thrust bearing b6.

As described above, an end portion of the output shaft 50 toward the speed reducing planetary gear 40 side in the axial direction is formed with the flange portion 50d that configures a portion of the carrier 46, and also formed with a large diameter portion 50c on a side of the flange portion 50d opposite from the speed reducing planetary gear 40 in the axial direction. An intermediate section of the output shaft 50 is formed as a small diameter portion 50b that has a smaller diameter than that of the large diameter portion 50c. A proximal section of the output shaft 50 is formed with a proximal end portion 50a that has a smaller diameter than that of the small diameter portion 50b. The needle bearing b5 is fitted by insertion between the speed reducing gear shaft 25 and the inner circumferential side of the large diameter portion 50c.

A sleeve 54 is fitted to an outer circumferential surface of the large diameter portion 50c of the output shaft 50. The seal ring 55 is provided between the sleeve 54 and the inner circumferential surface of the first cylinder portion $2CY_1$. Accordingly, the seal performance of the oil reservoir can be secured to prevent the penetration of foreign matter from outside. In addition, a toothed surface 54a is formed on an outer circumferential surface of the sleeve 54 toward the speed reducing planetary gear 40 side in the axial direction. A rotation speed sensor 59 that detects the passage of the teeth of the toothed surface 54a is provided facing the toothed surface 54a. Note that the rotation speed sensor 59 detects through the output shaft 50 the rotation of the wheel 100 to which a brake disc 71 of the disc brake device 70 is fixed. Therefore, the rotation speed sensor 59 may be used a speed sensor, an ABS rotation speed sensor, or the like. The wiring of the rotation speed sensor 59 is connected to a control unit (not shown) through a connector terminal portion 16 (see FIG. 2) provided on a side surface of the first cylinder portion $2CY_1$ on the case cover 2B side.

The wheel hub 51 is in spline engagement with an outer circumferential surface of the small diameter portion 50b of the output shaft 50. The proximal end portion 50a of the output shaft 50 threadedly engaged with a nut 53 retains and fixes the wheel hub 51. The hub bearing 52 is fitted on the outer circumferential side of a hollow-formed sleeve portion 51a of the wheel hub 51, between the sleeve portion 51a and the bearing support portion 2Aa of the main case 2A. In other words, the wheel hub 51 and the output shaft 50 are rotatably supported relative to the case 2. The hub bearing 52 is held between a snap ring 56 and the bearing support portion 2Aa of the main case 2A. The hub bearing 52 also contacts a side surface of the sleeve 54, and a proximal end of the sleeve 54 on the opposite side contacts the flange portion 50d, thereby securing good positioning support accuracy for the output shaft 50 in the axial direction.

A hub portion 51b formed into a cylindrical shape is provided on an end portion of the wheel hub 51 in the axial direction. A plurality of bolt holes 51c formed in the hub portion 51b is fitted by insertion with hub bolts 101 described in detail later. The wheel 100 is fastened to the hub bolts 101 by nuts 102, whereby the wheel 100 is configured as a vehicle wheel 200.

In the in-wheel motor drive device 1 thus configured, for example, when the control unit (not shown) initiates a power running control for the motor 3 based on an accelerator operation of the driver or the like, electric power is supplied from a power source (battery) and the inverter circuit to the stator 4 of the motor 3, whereby the rotor 5 is rotated and driven. This accordingly rotates and drives the rotor shaft 7, and the rotation of the rotor shaft 7 is reduced in speed and transmitted from the small diameter gear 21 through the idler gear 22 to the large diameter gear 25a of the speed reducing gear shaft 25. Consequent rotating and driving of the sun gear 25b of the speed reducing gear shaft 25 causes the carrier 46 in the speed reducing planetary gear 40 to rotate at a reduced speed via the stationary ring gear 41, and the rotation of the carrier 46 reduced in speed is transmitted to the output shaft 50 and the wheel hub 51 as a driving rotation to rotate and drive the vehicle wheel 200.

Conversely, for example, when the control unit (not shown) initiates a regenerative control based on an accelerator operation or brake operation of the driver, the output shaft 50 and the wheel hub 51 are rotated and driven by the inertial force of the vehicle and the like, and this rotation is reversely input to the carrier 46 of the speed reducing planetary gear 40, thus rotating the sun gear 25b of the speed reducing gear shaft 25 at an increased speed via the stationary ring gear 41. Moreover, the rotation of the speed reducing gear shaft 25 is transmitted as a rotation increased in speed to the small diameter gear 21 through the idler gear 22 and the large diameter gear 25a, whereby the rotor shaft 7 is rotated and driven. By applying a negative voltage to the stator 4, the rotation of the rotor 5 causes a counter-electromotive force to act on the stator 4, which is supplied as electric power to the power source through the inverter circuit to charge the power source.

Note that, the motor 3 of the in-wheel motor drive device $1_1$ according to the first embodiment is formed from an induction motor as described above. Therefore, in a running state in which a hybrid drive system (not shown) drives other vehicle wheels (e.g., the front vehicle wheels), even if the motor 3 is idled and not subjected to the power running control, the counter-electromotive force does not occur, and particularly during high speed running, i.e., fast rotation, of the motor 3, there is no need to perform a so-called weak magnetic field control to cancel out the torque generated by the counter-electromotive force. Thus, better fuel economy can be achieved.

Next, the structure of the vehicle wheel 200 provided with the in-wheel motor drive device $1_1$, and the attached state of the vehicle wheel 200 to the vehicle (suspension device 90) will be described with reference to FIGS. 1 to 4.

The vehicle wheel 200 is generally configured from the wheel 100, the disc brake device 70, and the in-wheel motor drive device $1_1$ described above. The vehicle wheel 200 is also configured such that, by attachment to the suspension device 90, the vehicle wheel 200 is allowed a predetermined range of movement with respect to the vehicle, and the vibrations of the vehicle wheel 200 are absorbed.

The wheel 100 is formed from a common generic product. As shown in FIG. 1, the wheel 100 includes a drum-like rim portion 100a to which a tire (not shown) is attached, and a disc portion 100b that is connected to an end portion of the rim portion 100a and supports the rim portion 100a. On an inner circumferential section of the disc portion 100b, a plurality of bolt holes 100c is formed in the same quantity as the plurality of bolt holes 51c of the wheel hub 51 at positions that correspond to the plurality of bolt holes 51c.

Accordingly, when attaching the wheel 100 to the wheel hub 51, the bolt holes 100c of the wheel 100 are aligned with the hub bolts 101 threadedly fastened to the bolt holes 51c of the wheel hub 51. In addition, the wheel 100 is mounted such that the hub bolts 101 run through the bolt holes 100c and are fastened by the nuts 102, thereby attaching the wheel 100 to the wheel hub 51. Note that, with the wheel 100 attached to the wheel hub 51, the brake disc 71 of the disc brake device 70 is also fastened together with the wheel 100 and the wheel hub 51, and the brake disc 71 is fastened unrotatable relative to the wheel 100 and the wheel hub 51 (i.e., the output shaft 50).

The disc brake device 70 is generally configured to include the brake disc 71, and the caliper 72. The caliper 72 rubs brake pads 75, 75, which hold the brake disc 71 therebetween, against the brake disc 71. The brake disc 71 includes an annular rubbed portion 71a that is rubbed by the brake pads 75, 75, and a flange portion 71b that supports the rubbed portion 71a. In the flange portion 71b, a plurality of through holes 71c is formed in the same quantity as the plurality of bolt holes 51c of the wheel hub 51 and the plurality of bolt holes 100c of the wheel 100 at positions that correspond to the plurality of bolt holes 51c and the plurality of bolt holes 100c. By assembling such that the hub bolts 101 run through the through holes 71c, the brake disc 71 is fastened together with the wheel 100 and the wheel hub 51 when the wheel 100 is fastened to the wheel hub 51 as described above.

As shown in FIG. 1, the caliper 72 is generally configured to include a piston portion 73, a cylinder portion 74, and the brake pads 75, 75. The brake pads 75, 75 are respectively supported by pad holders 76, 76, and disposed so as to face both side surfaces of the rubbed portion 71a of the brake disc 71. The cylinder portion 74 is formed to have a C shape in a cross-sectional view, and includes a support portion 74a that supports the brake pad 75 on the one side in the axial direction (left side in FIG. 1). The cylinder portion 74 is also fixed to a torque member 77.

The piston portion 73 has built therein a piston (not shown) that can be driven by brake oil supplied from an oil passage (not shown). Supplying the brake oil drives the piston (not shown) to press the brake pad 75 on the other side in the axial direction (right side in FIG. 1) toward the rubbed portion 71a of the brake disc 71, and applies a reaction force to the support portion 74a of the cylinder portion 74 such that the brake pads 75, 75 sandwich and rub against the rubbed portion 71a of the brake disc 71. Note that levers for a side brake mechanism 80 are provided on a side surface of the piston portion 73.

Meanwhile, as shown in FIG. 2, on an outer surface on the main case 2A of the case 2 of the in-wheel motor drive device $1_1$ on the side of the vertical line V opposite the second cylinder portion $2CY_2$ of the case 2 (motor 3), the plate-like caliper fixing portion 2Ab is integratedly disposed on the case 2. The torque member 77 is fixed to the caliper fixing portion 2Ab through bolts 79, which fixes the cylinder portion 74, i.e., fixes the caliper 72 to the case 2. Thus, as described above, the caliper 72 and the second cylinder portion $2CY_2$ (motor 3) are disposed on the outer periphery of the first cylinder portion $2CY_1$ and provided aligned at different positions in the circumferential direction.

Figure 3:
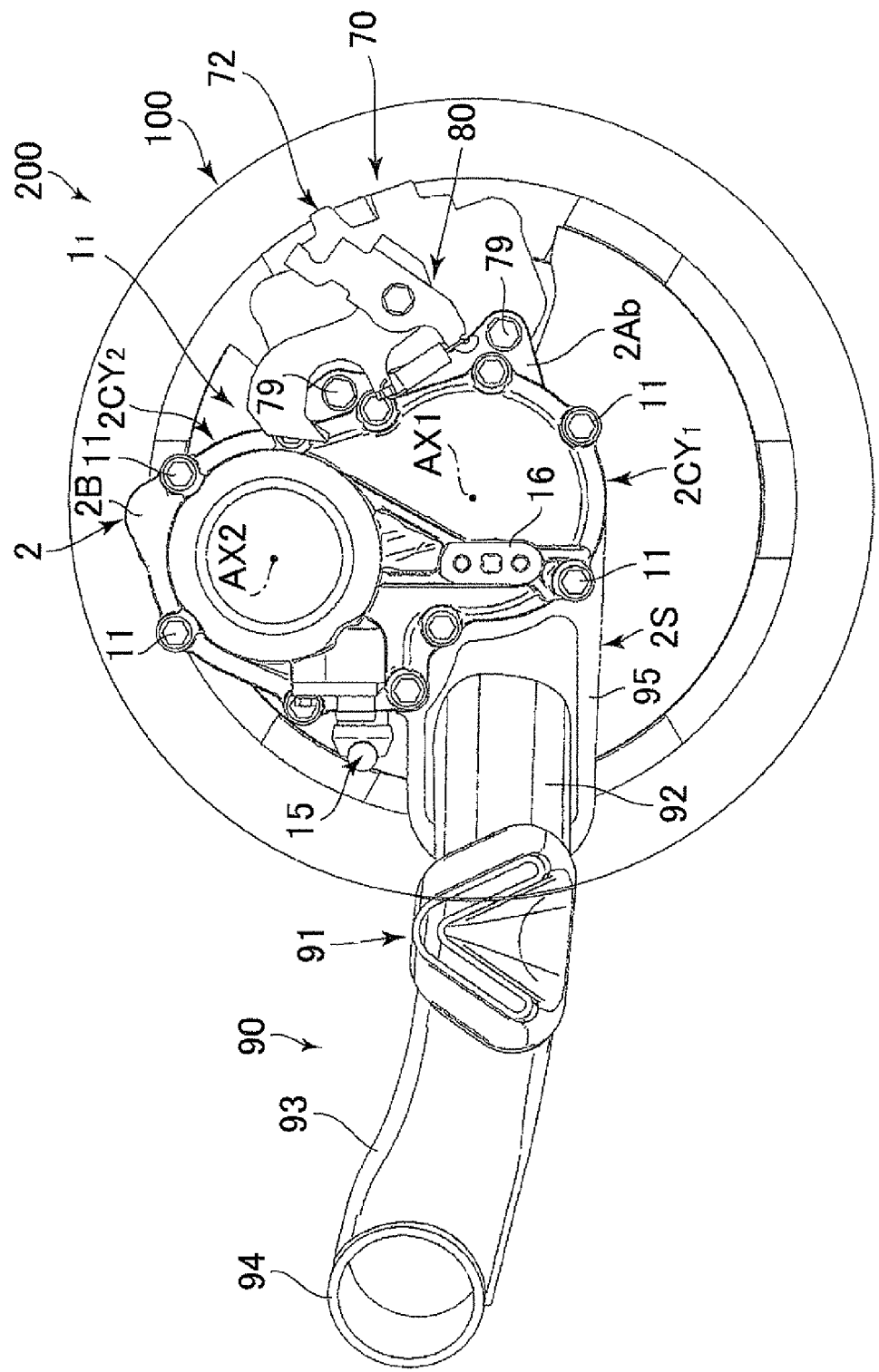
FIG. 3 is a side view that shows the vehicle wheel attached to a suspension device according to the first embodiment.
Figure 4:
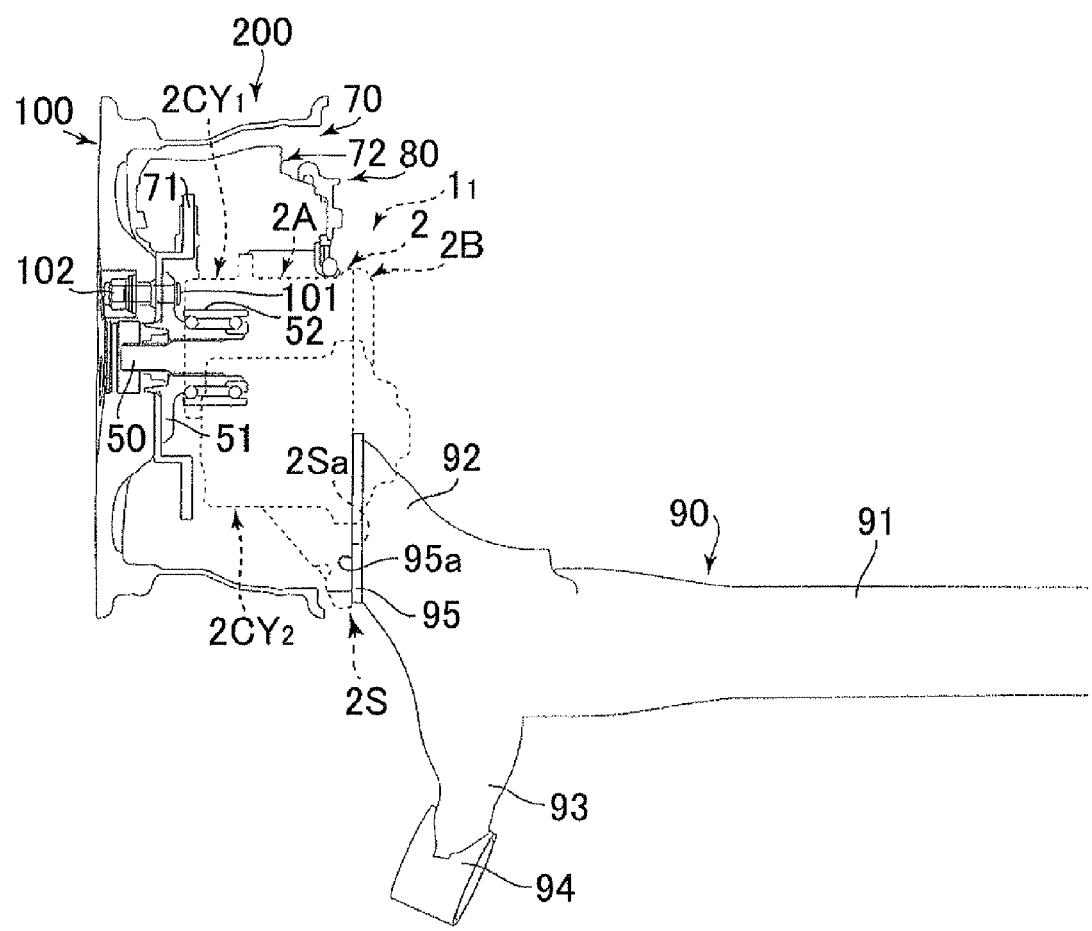
FIG. 4 is a top view that shows the vehicle wheel attached to the suspension device according to the first embodiment.

Next, the attached state of the vehicle wheel 200 to the suspension device 90 will be described. As shown in FIGS. 3 and 4, the suspension device 90 is configured to include a cross beam 91 that has a V shape in a cross-sectional view and spans across the vehicle left-right direction, a trailing arm 93 that extends from an end portion of the cross beam 91 toward the vehicle front side, a link 94 that latches the trailing arm 93 to the vehicle, a hub arm 92 that extends from an intersecting section between the cross beam 91 and the trailing arm 93 toward the vehicle wheel 200, and a plate-like joining portion 95 that is fixedly mounted to a proximal end of the hub arm 92. Note that, above the end portion of the cross beam 91, a shock absorber (not shown) and the like are disposed, which absorbs up-down vibrations and restricts the position of the suspension device 90 in the up-down direction with respect to the vehicle.

The joining portion 95 fixedly mounted to the proximal end of the hub arm 92 has a joining surface 95a that is joined to a joining surface 2Sa of the suspension fixing portion 2S that integrally extends from the main case 2A of the case 2 described above. Accordingly, on the front side (one side) that is the second cylinder portion $2CY_2$ side with respect to the vertical line V (see FIG. 2), the suspension device 90 and the in-wheel motor drive device $1_1$ are attached forward of the first cylinder portion $2CY_1$ and lower than the second cylinder portion $2CY_2$. That is, the in-wheel motor drive device is attached to the suspension device 90 without interfering with the layout position of the motor 3 or involving the case cover 2B.

Figure 9:
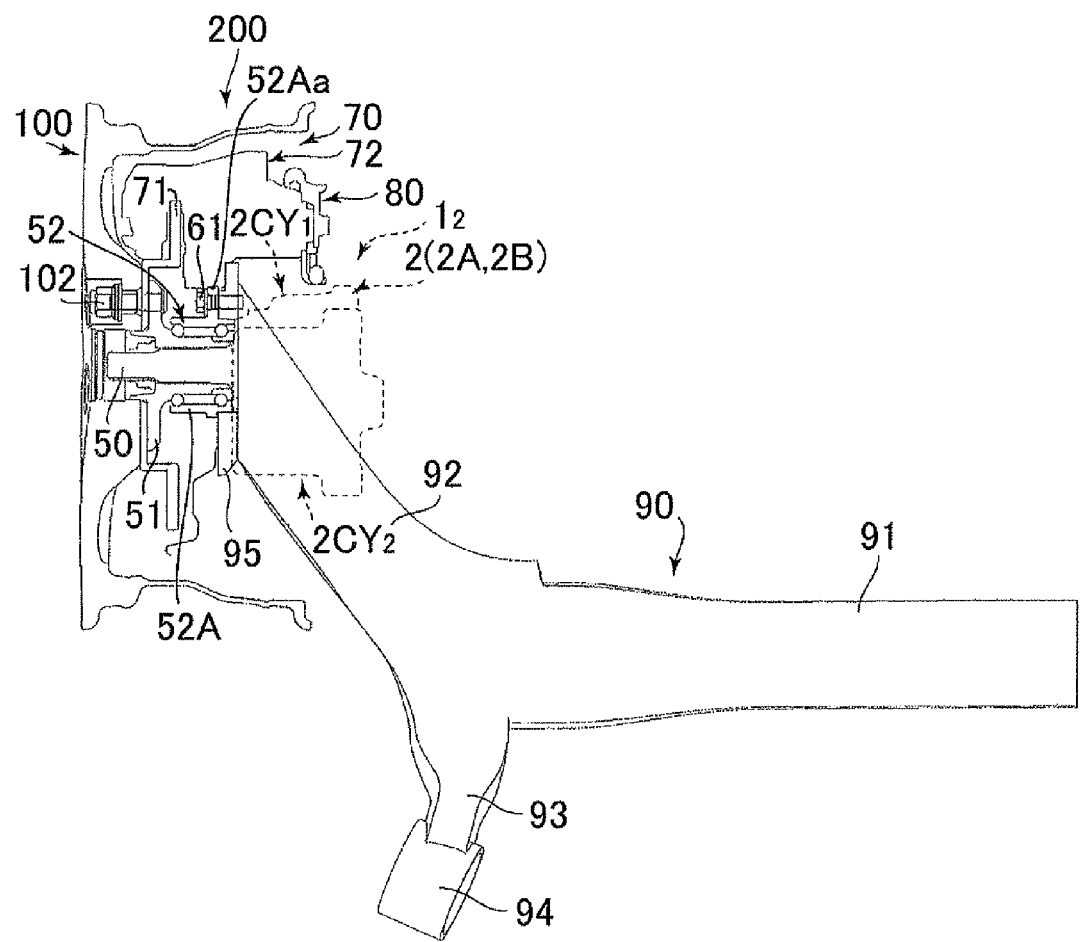
FIG. 9 is a top view that shows the vehicle wheel attached to the suspension device according to the second embodiment.

Note that, in a common vehicle, the hub arm 92 of the suspension device 90 is configured so as to extend to or near the hub bearing 52 supporting the wheel hub 51 and directly supports the hub bearing 52 (e.g., see FIG. 9). However, in the first embodiment, the in-wheel motor drive device $1_1$ can be attached to the suspension device 90 through a simple modification of shortening by cutting the hub arm 92 or the like.

According to the in-wheel motor drive device $1_1$ described above, the motor 3 is disposed on the second axis AX2 parallel to the first axis AX1. In addition, the motor 3 and the speed reducing planetary gear 40 are positioned in a radial cross section perpendicular to the first axis AX1 and the second axis AX2. It is thus possible to prevent the motor 3 from intruding into the vehicle side, and an increase in the radial length of the overall in-wheel motor drive device $1_1$. In addition, the in-wheel motor drive device $1_1$ can also be prevented from interfering with the suspension device 90 and the brake device 70. Therefore, no significant design changes are required of the suspension device 90 and the brake device 70, and the in-wheel motor drive device $1_1$ has improved vehicle mountability.

In addition, an increase in the PCD of the hub bolts 101 caused by disposing the speed reducing planetary gear 40 circumferentially inward of the wheel hub 51, for example, can be prevented, and the PCD of the hub bolts 101 can thus be set to a more versatile size. Therefore, the use of a special wheel or the like is not necessary, and a common wheel 100 can be attached without modification to the wheel hub 51.

The motor 3 is disposed around the first axis AX1 at a position different in the circumferential direction from the caliper 72 of the disc brake device 70. Therefore, the motor 3 and the caliper 72 are not provided aligned in the axial direction, and the motor 3 and the caliper 72 can be disposed on the inner side of the wheel 100 without interfering with each other, which prevents an increase in the axial length of the in-wheel motor drive device $1_1$.

The second cylinder portion $2CY_2$ of the case 2 is disposed offset toward the one side (e.g., the forward side in the vehicle advancing direction) with respect to the vertical line V perpendicular at the first axis AX1 to the horizontal line H that passes through the first axis AX1. The caliper fixing portion 2Ab that fixes the caliper 72 is provided on an outer surface of the second cylinder portion $2CY_2$ on the other side with respect to the vertical line V of the case 2 (e.g., the reverse side in the vehicle advancing direction). Therefore, the motor 3 and the caliper 72 can be disposed on the outer circumferential side of the first cylinder portion $2CY_1$ of the case 2 at different positions in the circumferential direction. Thus, the motor 3 and the caliper 72 are not provided aligned in the axial direction, and the motor 3 and the caliper 72 can be disposed on the inner side of the wheel 100 without interfering with each other.

As stated above, the second cylinder portion $2CY_2$ of the case 2 is disposed offset toward the one side (e.g., the forward side in the vehicle advancing direction) with respect to the vertical line V perpendicular at the first axis AX1 to the horizontal line H that passes through the first axis AX1. Moreover, the suspension fixing portion 2S that is fixed to the suspension device 90 is provided on the one side with respect to the vertical line V of the case 2, and lower than the second cylinder portion $2CY_2$. Therefore, the motor 3 and the hub arm 92 of the suspension device 90 can be disposed on the outer circumferential side of the first cylinder portion $2CY_1$ of the case 2 at different positions in the circumferential direction. Thus, the motor 3 and the suspension device 90 can be disposed without interfering with each other.

The suspension fixing portion 2S is also provided integrally extending from the main case 2A. Therefore, the vehicle wheel 200 can be supported by the suspension device 90 without involving the case cover 2B. Thus, because the supporting force for the vehicle wheel 200 is not transmitted to the case cover 2B, there is no need to increase the thickness of the case cover 2B or strengthen a fastened section between the case cover 2B and the main case 2A. As a consequence, the in-wheel motor drive device $1_1$ can be made more compact in the axial direction and reduced in weight.

The second axis AX2 on which the motor 3 is provided is also disposed higher than the first axis AX1, that is, the motor 3 is disposed higher than the center of the wheel 100. Therefore, a layout structure effective against flooding and muddying of the motor 3 can be achieved. In addition, the oil reservoir is formed on the lower side of the case 2 and oil (lubrication oil) is sealed inside the case 2 of the in-wheel motor drive device $1_1$. However, the motor 3 is disposed higher. Therefore, the rotation of the motor 3 can be prevented from agitating the reservoir of oil accumulated on the lower side of the case 2. As a consequence, loss in the motor 3 from oil agitation can be reduced, and the fuel consumption (electricity consumption) of the vehicle can also be reduced.

The speed reducing planetary gear 40 is disposed parallel on the first axis AX1 to the hub bearing 52 that rotatably supports the output shaft 50. Therefore, an increase in the size of the diameter of the hub bearing 52 caused by disposing the speed reducing planetary gear circumferentially inward of the hub bearing 52 can be prevented. As a consequence, the hub bearing 52 can be set to a more versatile size. Thus, the diameter of the output shaft 50 supported by the hub bearing 52 can also be set to a more versatile size, whereby the wheel hub 51 can be set to a more versatile size as well. As a consequence, the use of a special wheel or the like is not necessary, and a common wheel 100 can be attached without modification to the wheel hub 51.

Second Embodiment

A second embodiment that partially modifies the first embodiment described above will be explained next with reference to FIGS. 6 to 9. Note that, in the description of the second embodiment, like reference symbols are used for parts identical to those of the first embodiment and such parts are not described further here.

The second embodiment has a configuration in which the attachment position of the suspension device 90 is modified compared to the first embodiment described above, and the output shaft 50 is directly supported by the suspension device 90 without the intervention of the case 2 of an in-wheel motor drive device $1_2$. The joining portion 95 of the hub arm 92 of the suspension device 90 is interposed between the wheel hub 51 and the main case 2A, which shortens the main case 2A in the axial direction, and also shortens the motor 3 in the axial direction as a consequence. Thus, the motor 3 can be changed to a small induction motor with a small output.

Figure 6:
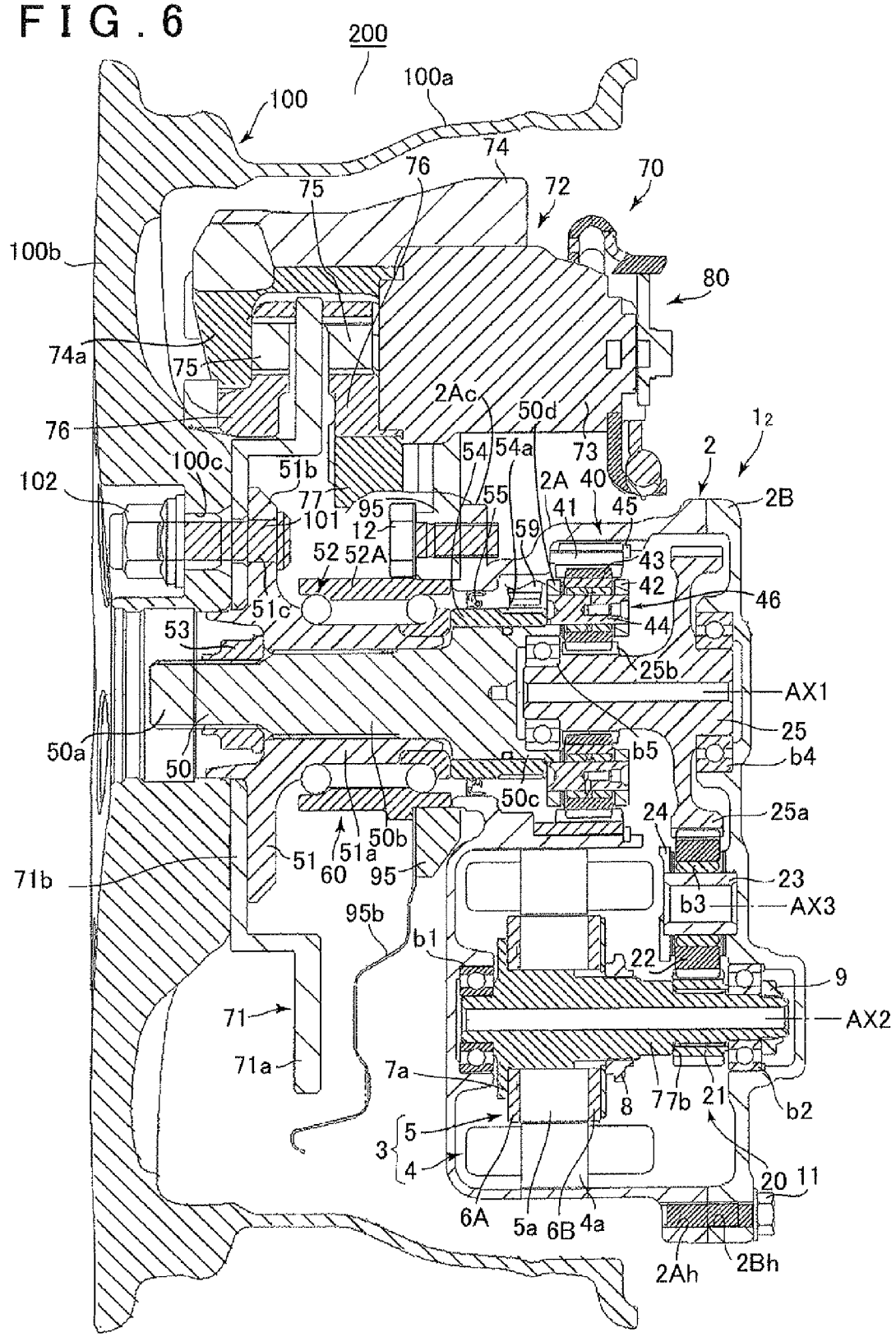
FIG. 6 is a cross-sectional view that shows the vehicle wheel provided with an in-wheel motor drive device according to a second embodiment.

More specifically, in the in-wheel motor drive device $1_2$ according to the second embodiment, the case 2 is configured from the main case 2A, and the case cover 2B that closes the opening of the main case 2A, as shown in FIG. 6. On the outer periphery of the end portion of the main case 2A on its opening side, a flange portion 2Ac is formed protruding. The flange portion 2Ac is joined and fixed by a plurality of bolts 12 to the plate-like joining portion 95 that is formed on the proximal end portion of the hub arm 92 of the suspension device 90. That is, the main case 2A is fixed and attached to the joining portion 95 of the suspension device 90. Note that, in FIG. 6, the flange portion 2Ac is shown as longer on the caliper 72 side of the output shaft 50 and shorter on the opposite side from the output shaft 50. This is because the flange portion 2Ac is formed such that only the section thereof fastened with the bolts 12 protrudes from the outer periphery of the main case 2A. The main case 2A is shortened in the axial direction as described above, and the axial length of the in-wheel motor drive device $1_2$ is substantially the same as that of the in-wheel motor drive device $1_1$ according to the first embodiment.

The outer circumferential side of the hub bearing 52 includes a bearing case 52A, and the ball mechanism of the hub bearing 52 is directly supported on the inner circumferential side of the bearing case 52A. The hub bearing 52 and the wheel hub 51 configure a hub unit bearing 60 that rotatably supports the output shaft 50 and the wheel hub 51. As shown in FIG. 9, the outer circumferential side of the bearing case 52A includes a flange portion 52Aa integrally formed extending therefrom. The flange portion 52Aa is joined and fixed by a plurality of bolts 61 to the joining portion 95 that is fixed to the proximal end of the hub arm 92.

Note that, in FIG. 9, the flange portion 52Aa is shown as longer on the caliper 72 side of the hub bearing 52 and shorter on the opposite side of the hub bearing 52. This is because the flange portion 52Aa is formed such that only the section thereof fastened with the bolts 61 protrudes from the outer periphery of the bearing case 52A. In addition, the torque member 77 of the caliper 72 is fixed by a plurality of bolts 79 (see FIGS. 7 and 8) to the joining portion 95 of the hub arm 92.

Figure 7:
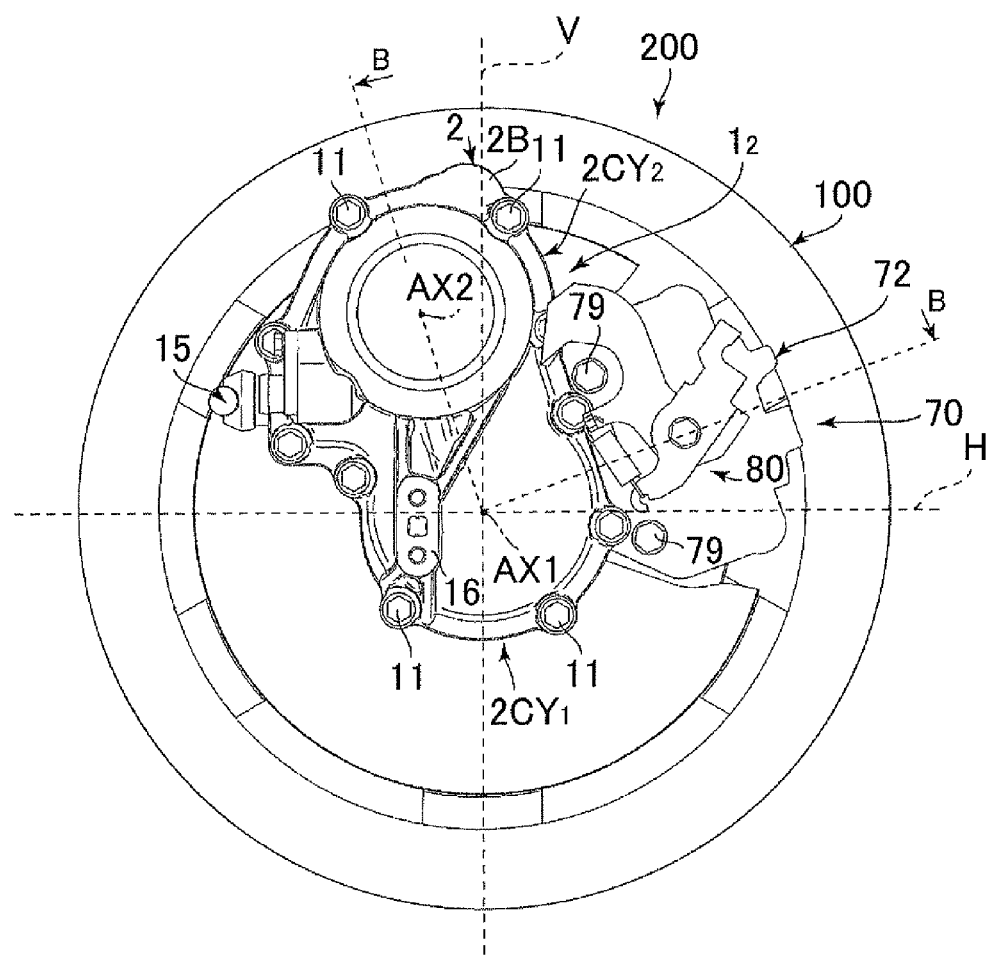
FIG. 7 is a side view that shows the vehicle wheel provided with the in-wheel motor drive device according to the second embodiment.
Figure 8:
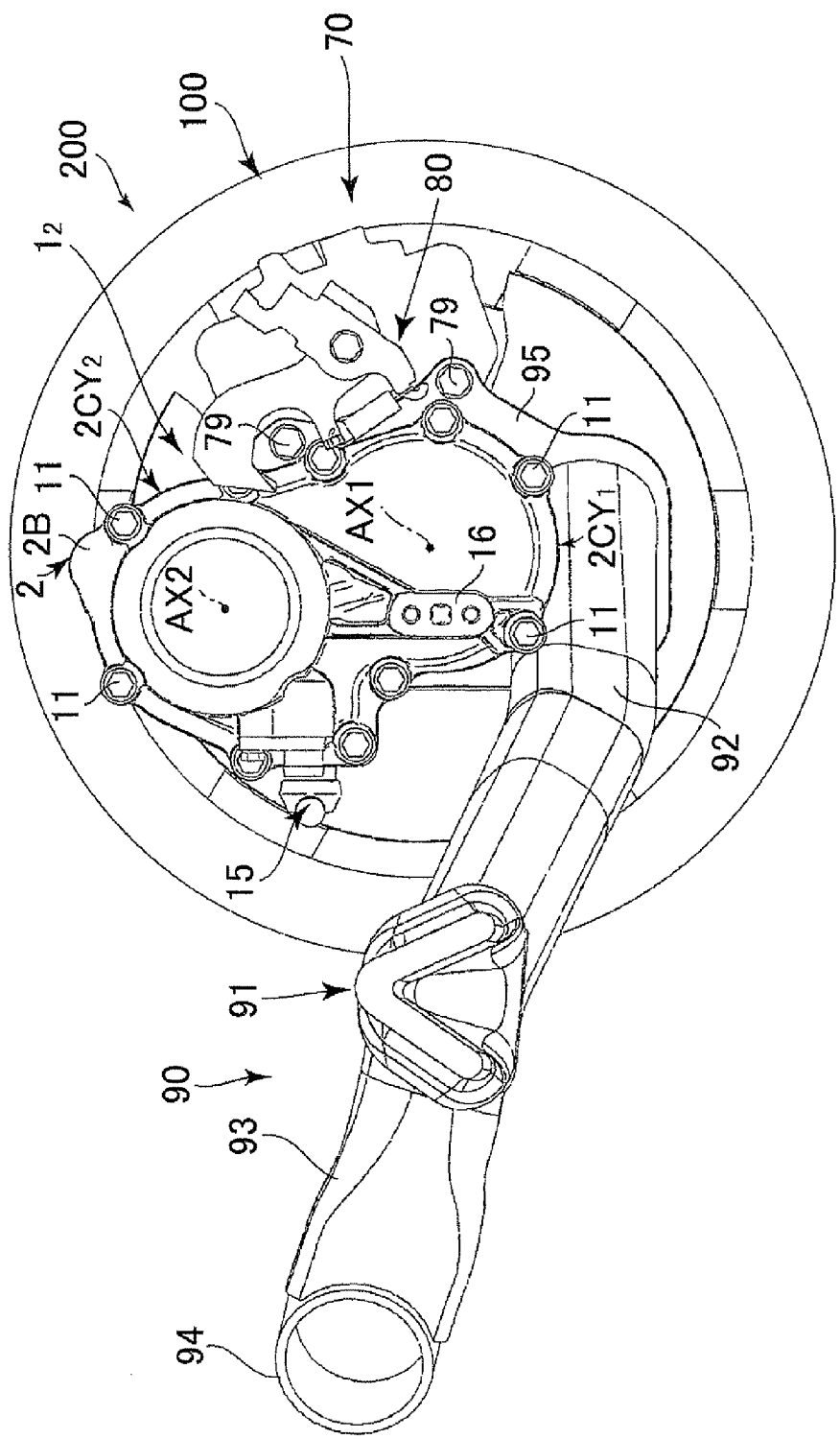
FIG. 8 is a side view that shows the vehicle wheel attached to the suspension device according to the second embodiment.

As shown in FIG. 7, between the thus configured in-wheel motor drive device $1_2$ and the rim portion 100a of the wheel 100, there is a space that spans from a front section to a lower section of the first cylinder portion $2CY_1$ of the main case 2A, and corresponds to an area where the suspension fixing portion 2S is eliminated. With the in-wheel motor drive device $1_2$ attached to the suspension device 90, as shown in FIGS. 8 and 9, the hub arm 92 passes from the front to below the first cylinder portion $2CY_1$ of the main case 2A and is fixed by the joining portion 95 joining with a flange portion 2Ac.

Note that the configuration in which the hub arm 92 of the suspension device 90 extends to an outer circumferential section of the hub bearing 52 may employ a configuration that is substantially the same as the common configuration of a vehicle wheel not provided with an in-wheel motor drive device. In other words, the in-wheel motor drive device $1_2$ can be attached without substantially modifying the suspension device 90 or the disc brake device 70.

According to the in-wheel motor drive device $1_2$ of the second embodiment described above, the case 2 is fixed to the joining portion 95 of the suspension device 90 by the suspension device 90 passing below the case 2 and the joining portion 95 joining with the hub bearing 52 that rotatably supports the output shaft 50. Therefore, the vehicle wheel 200 can be supported by the suspension device 90 without involving the case 2. Thus, because the supporting force for the vehicle wheel 200 is not transmitted to the main case 2A and the case cover 2B (i.e., the case 2), there is no need to increase the thickness of the case 2 or strengthen a fastened section between the joining portion 95 of the suspension device 90 and the main case 2A. As a consequence, the in-wheel motor drive device $1_2$ can be made more compact in the axial direction and reduced in weight.

Note that, compared to the first embodiment, the bearing b5 that rotatably supports one side of the speed reducing gear shaft 25 is changed from a needle bearing to a ball bearing in the in-wheel motor drive device $1_2$ according to the second embodiment. This is because the elimination of the caliper fixing portion 2Ab (see FIG. 1) provided circumferentially outward of the rotation speed sensor 59 creates a space in the radial direction, thus a ball bearing with more durability is employed. However, a needle bearing may be adopted if there are any particular restrictions concerning the radial direction.

Other configurations, operations, and effects of the in-wheel motor drive device $1_2$ not mentioned here are identical to those of the first embodiment and will not be described further here.

Third Embodiment

Figure 10:
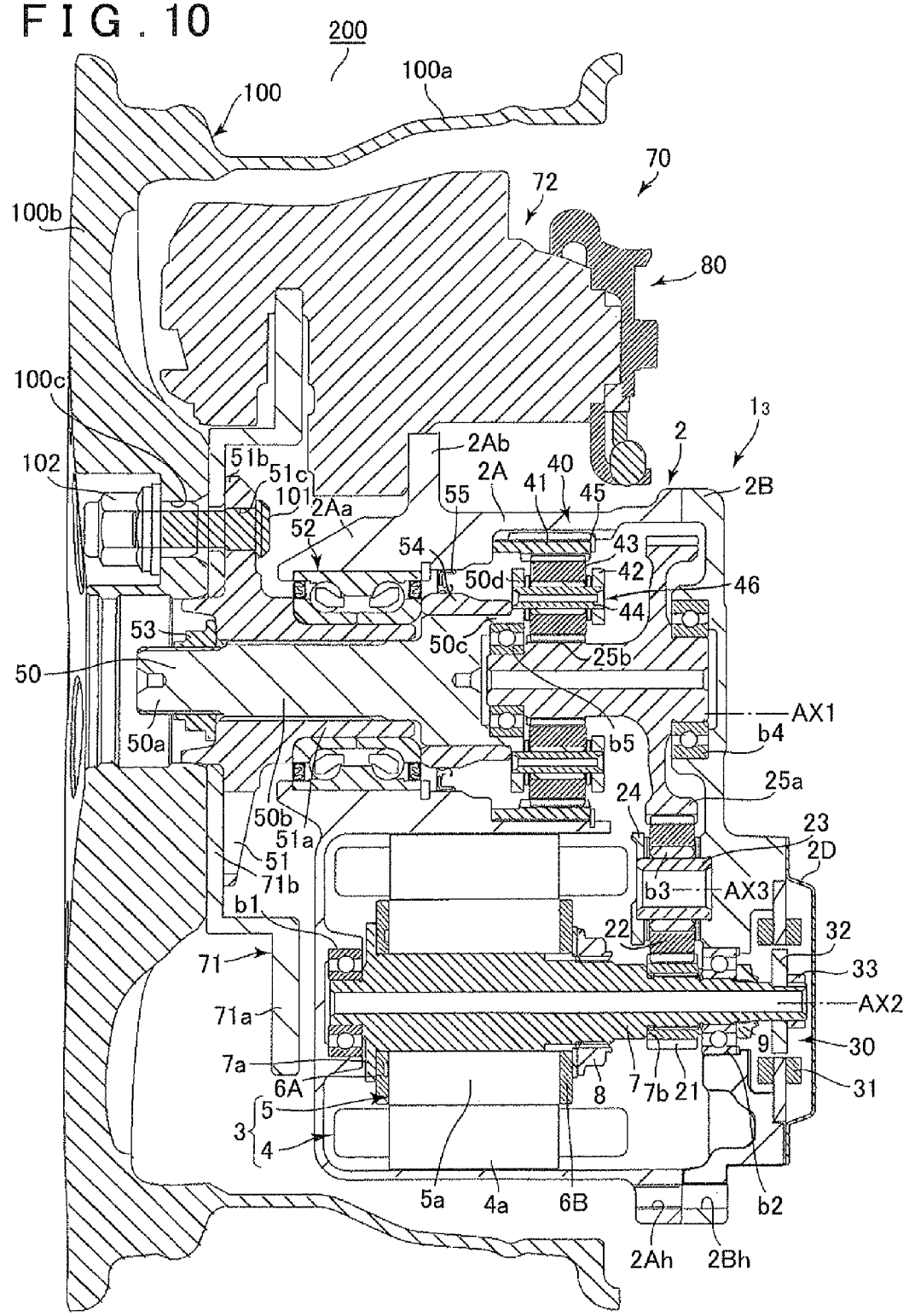
FIG. 10 is a cross-sectional view that shows the vehicle wheel provided with an in-wheel motor drive device according to a third embodiment.

A third embodiment that partially modifies the first embodiment described above will be explained next with reference to FIG. 10. Note that, in the description of the third embodiment, like reference symbols are used for parts identical to those of the first embodiment and such parts are not described further here.

In the third embodiment, compared to the first embodiment described above, the motor 3 is changed from an induction motor to an IPM synchronous motor (permanent magnet embedded type motor). Accompanying the modification of the motor 3, in order to perform a control that detects the precise rotation position of the motor 3, a resolver device 30 is installed that detects the rotation position of the rotor shaft 7.

More specifically, the resolver device 30 of an in-wheel motor drive device $1_3$ is configured to include a resolver rotor 32 that is fastened by a nut 33 that is more toward the proximal end portion of the rotor shaft 7 (the end portion on the right side in FIG. 10) than the nut 9 of the rotor shaft 7, and a resolver stator 31 that is fixedly mounted to the side surface of the case cover 2B. The resolver device 30 is accommodated in a resolver chamber 34 that is covered by a lid member 2D detachably fixed to the case cover 2B. The resolver device 30 is configured such that, after manufacture of the in-wheel motor drive device $1_3$, the phase (angle) of the resolver rotor 32 relative to the rotor shaft 7 can be adjusted by removing the cover member 2D and loosening the nut 33.

Note that, in the in-wheel motor drive device $1_3$, the rotation speed of the rotor shaft 7 can be detected by the resolver device 30. Therefore, the rotation speed of the output shaft 50 can be calculated by multiplying the detection result together with the gear ratios of the speed reducing gear mechanism 20 and the speed reducing planetary gear 40. The rotation speed sensor 59 can thus be omitted.

The in-wheel motor drive device $1_3$ in which the motor 3 is thus configured by an IPM synchronous motor generates a counter-electromotive force when rotated at high speed, compared to the induction motor of the first embodiment described above. This increases the output torque of the motor 3, which necessitates performing a so-called weak magnetic field control. Therefore, the vehicle overall has a high drive power output performance.

Note that, compared to the first embodiment, the bearing b5 that rotatably supports one side of the speed reducing gear shaft 25 is changed from a needle bearing to a ball bearing in the in-wheel motor drive device $1_3$ according to the third embodiment, similar to the second embodiment. This is because the elimination of the caliper fixing portion 2Ab (see FIG. 1) provided circumferentially outward of the rotation speed sensor 59 creates a space in the radial direction, thus a ball bearing with more durability is employed. However, a needle bearing may be adopted if there are any particular restrictions concerning the radial direction.

Other configurations, operations, and effects of the in-wheel motor drive device $1_3$ not mentioned here are identical to those of the first embodiment and will not be described further here.

Fourth Embodiment

A fourth embodiment that partially modifies the first embodiment described above will be explained next with reference to FIGS. 11 to 12. Note that, in the description of the fourth embodiment, like reference symbols are used for parts identical to those of the first embodiment and such parts are not described further here.

In the fourth embodiment, the structure of the speed reducing gear mechanism 20 is modified compared to the first embodiment described above such that, although the position of the large diameter gear 25a in the axial direction remains substantially the same, the motor 3 has an increased length in the axial direction to allow a larger size (higher output).

Figure 11:
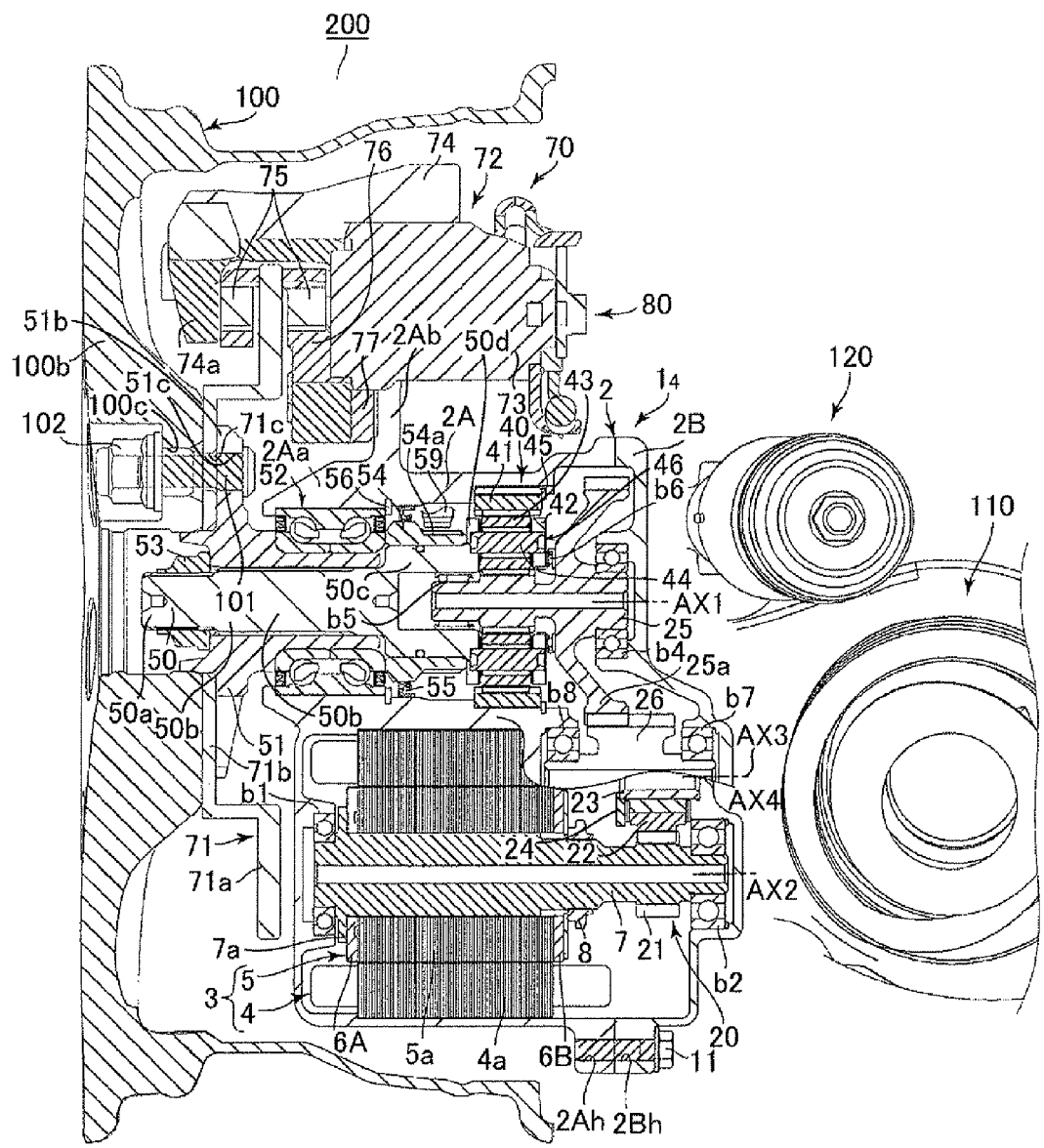
FIG. 11 is a cross-sectional view that shows the vehicle wheel provided with an in-wheel motor drive device according to a fourth embodiment.
Figure 12:
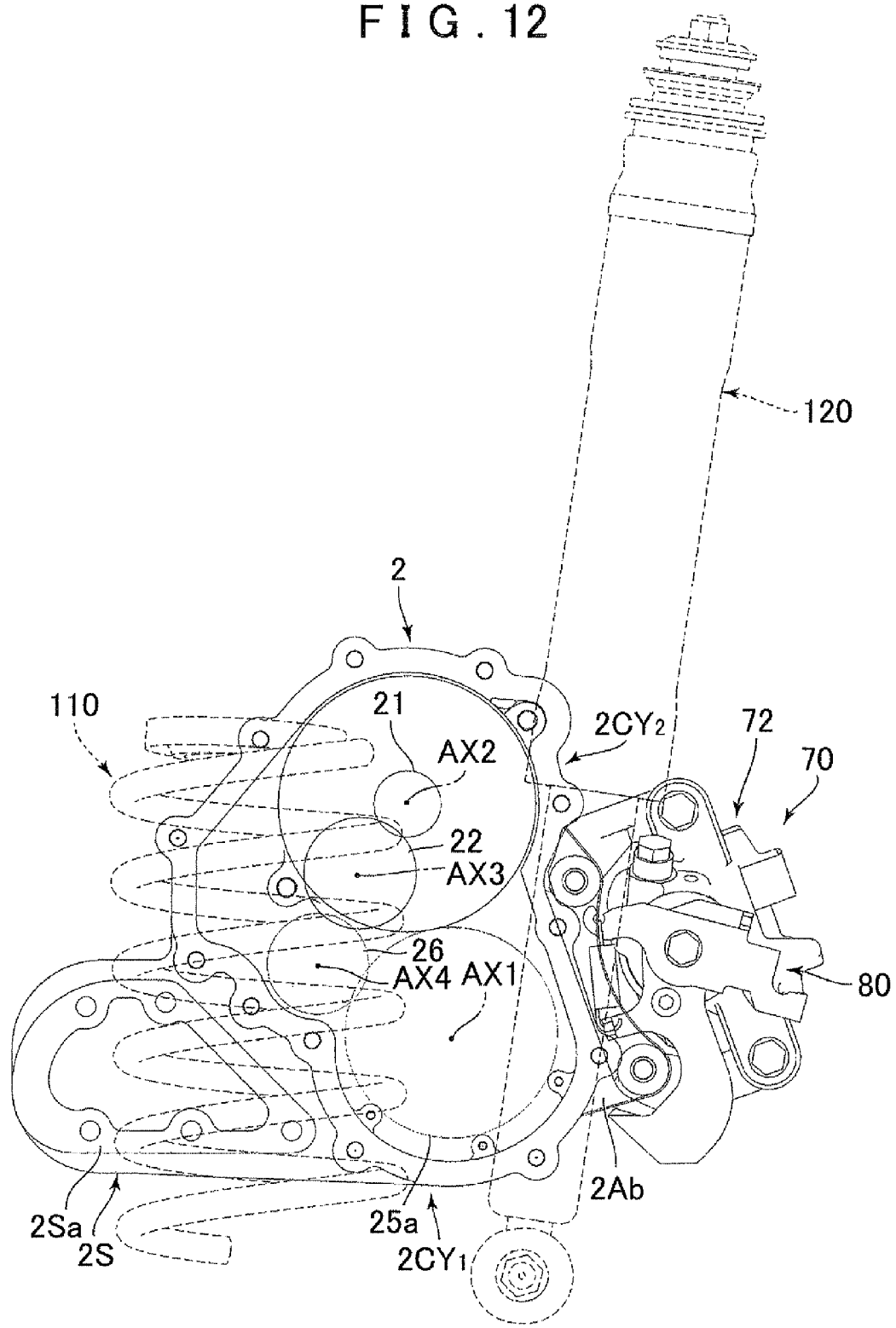
FIG. 12 is a schematic side view that shows the positional relationship of first to fourth axes of the in-wheel motor drive device according to the fourth embodiment.

That is, as shown in FIGS. 11 and 12, on a vehicle body side (a side axially opposite from the wheel 100 and the output shaft 50) of an in-wheel motor drive device $1_4$, a coil spring 110 and a shock absorber (damper) 120 are disposed between the in-wheel motor drive device $1_4$ and the vehicle body (not shown) and above the cross beam 91 (e.g., see FIGS. 3 and 4). In particular, because the lower side of the shock absorber 120 faces outward of the vehicle body due to the camber angle, a lower section of the shock absorber 120 is disposed in close proximity to the first cylinder portion $2CY_1$ of the case 2. It is therefore difficult to move and dispose the large diameter gear 25a of the speed reducing gear mechanism 20 toward the vehicle body side in the axial direction. However, there is relative space between the coil spring 110 and the vehicle body side of the second cylinder portion $2CY_2$ of the case 2, that is, the vehicle body side of the motor 3.

But, similar to the first embodiment described above, for example, in a configuration in which the large diameter gear 25a on the first axis AX1, the idler gear 22 on the third axis AX3, and the small diameter gear 21 on the second axis AX2 are aligned (see FIGS. 1 and 5), extending the motor 3 in the axial direction moves the idler gear 22 toward the vehicle body side so as not to interfere with the motor 3, and the large diameter gear 25a must also be moved toward the vehicle body side. However, the large diameter gear 25a cannot be moved because of the existence of the shock absorber 120. In other words, with the structure of the first embodiment, the motor 3 cannot be expanded (increased in size) in the axial direction, and the output performance cannot be improved.

Hence, in the fourth embodiment, a counter gear 26 is provided on a fourth axis AX4 parallel to the first axis AX1, the second axis AX2, and the third axis AX3 at a position that does not overlap with the outer diameter of the motor 3 as viewed from the axial direction, i.e., at a position outside the range of the outer diameter of the motor 3 (see FIG. 12).

More specifically, the speed reducing gear mechanism 20 of the fourth embodiment, as shown in FIG. 11, includes the large diameter gear (first rotating body) 25a drive-coupled to the speed reducing planetary gear 40 at substantially the same position in the axial direction as in the first embodiment. Meanwhile, the motor 3 is expanded toward the vehicle body side in the axial direction. In addition, the small diameter gear (second rotating body) 21 is disposed offset toward the side of the large diameter gear 25a opposite from the output shaft 50 side in the axial direction, and drive-coupled to the motor 3. Moreover, a portion of the outer diameter of the idler gear 22 is disposed so as to protrude farther outward than the outer diameter of the motor 3 (see FIG. 12), and meshes with the small diameter gear 21. The idler gear 22 also meshes with the counter gear (counter member) 26 disposed on the fourth axis AX4.

Note that, although the small diameter gear 21 of the fourth embodiment is integrally formed with the rotor shaft 7, the small diameter gear 21 may be separately formed as in the first embodiment. Also, compared to the first embodiment, as shown in FIG. 12, the position of the idler gear 22 (third axis AX3) is moved toward the suspension fixing portion 2S side in the circumferential direction instead of linear with the first axis AX1 and the second axis AX2. However, the support structure and the like of the idler gear 22 is the same as that in the first embodiment.

As shown in FIG. 11, the counter gear 26 is rotatably supported on both ends thereof with respect to the case 2 by ball bearings b7, b8. The counter gear 26 is also disposed in a radial cross section perpendicular to the large diameter gear 25a and the small diameter gear 21 (idler gear 22) so as to span between the large diameter gear 25a and the small diameter gear 21 (idler gear 22), that is, the counter gear 26 is configured to have an axial length that enables the counter gear 26 to span between and overlap in the axial direction with the large diameter gear 25a and the idler gear 22 as viewed from the radial direction. The counter gear 26 is also drive-coupled at different positions in the axial direction to the small diameter gear 21 and the large diameter gear 25a through the idler gear 22.

According to the in-wheel motor drive device $1_4$ of the fourth embodiment described above, the counter gear 26 is disposed at a position that does not overlap with the outer diameter of the motor 3, and also disposed in a radial cross section perpendicular to the large diameter gear 25a and the small diameter gear 21 so as to span between the large diameter gear 25a and the small diameter gear 21. In addition, the counter gear 26 is drive-coupled to the large diameter gear 25a and the small diameter gear 21. Therefore, the length of the motor 3 in the axial direction can be expanded without moving the position of the large diameter gear 25a toward the vehicle body side. Thus, even if the in-wheel motor drive device $1_4$ is mounted in a vehicle in which the axial length of the first axis AX1 is restricted by the shock absorber 120, for example, the output performance of the motor 3 can be improved.

In addition, the counter gear 26 is disposed on the fourth axis AX4 parallel to the first axis AX1 and the second axis AX2, and meshes at different positions in the axial direction with the large diameter gear 25a and the idler gear 22 that meshes with the small diameter gear 21. Therefore, the large diameter gear 25a and the small diameter gear 21 can be drive-coupled at different positions in the axial direction.

Note that, in the fourth embodiment, the vehicle body side of the counter gear 26 in the axial direction is drive-coupled to the small diameter gear 21 through the idler gear 22. However, the present invention is not limited to this example, and the counter member and the second rotating body on the rotor shaft 7 may be configured as drive-coupled through a belt, a chain, or the like.

Other configurations, operations, and effects of the in-wheel motor drive device $1_4$ not mentioned here are identical to those of the first embodiment and will not be described further here.

Note that, in the in-wheel motor drive devices $1_1, 1_2, 1_3, 1_4$ of the first to fourth embodiments described above, the motor 3 (second axis AX2) is disposed higher than the first axis AX1. However, depending on the position of the caliper of the brake device, or the attachment position of the suspension device, the motor 3 (second axis AX2) may be disposed lower than the first axis AX1, that is, the present invention may be applied so long as the motor 3 is disposed at a position that overlaps in the radial direction with the speed reducing mechanism (speed reducing planetary gear 40), and does not interfere with the brake device or the suspension device.

According to the first to fourth embodiments, as an example, the speed reducing planetary gear 40 is used as the speed reducing mechanism. However, the speed reducing mechanism may be something else. For example, as the speed reducing mechanism, a cycloid speed reducer (Japanese Patent Application Publication No. JP-A-2009-58005) or a roller speed reducer (Japanese Patent Application Publication No. JP-A-2006-103521) may be used.

According to the first to third embodiments, the speed reducing mechanism 20 is configured from the small diameter gear 21, the idler gear 22, and the large diameter gear 25a. However, the speed reducing mechanism 20 may have a configuration in which the rotation of the rotor shaft 7 is transmitted to the speed reducing planetary gear 40 through a belt, a chain, or the like, for example.

The in-wheel motor drive devices $1_1, 1_2, 1_3, 1_4$ according to the respective first to fourth embodiments are basically mounted to the vehicle wheel on the right side with respect to the vehicle advancing direction. However, the in-wheel motor drive devices $1_1, 1_2, 1_3, 1_4$ may obviously be mounted to both the right and left vehicle wheels. For the in-wheel motor drive devices $1_1, 1_2, 1_3, 1_4$ mounted to the vehicle wheel on the left side, the front-rear direction is reversed (as reflected in a mirror) in FIGS. 1 to 12.

The in-wheel motor drive device according to the present invention can be used as an in-wheel motor drive device attached to the inner side of a vehicle wheel of a vehicle such as a passenger vehicle or truck, and is particularly well suited for use when interference with a suspension device and a brake device must be prevented and improved vehicle mountability is required.

What is claimed is:

1. An in-wheel motor drive device that is attached to an inner side of a wheel of a vehicle wheel and drives the vehicle wheel, comprising:
    a rotating electric machine;
    a transmission mechanism that transmits the rotation of the rotating electric machine;
    a speed reducing mechanism that reduces in speed the rotation transmitted by the transmission mechanism; and an output shaft that outputs the reduced-speed rotation of the speed reducing mechanism to the wheel, wherein the speed reducing mechanism and the output shaft are disposed on a first axis coaxial with a center of the wheel, the rotating electric machine is disposed on a second axis parallel to the first axis, and a portion of the rotating electric machine and a portion of the speed reducing mechanism are positioned along the same radial plane.

2. The in-wheel motor drive device according to claim 1, wherein the rotating electric machine is disposed around the first axis at a position different in the circumferential direction from a caliper of a disc brake device attached to the inner side of the wheel of the vehicle wheel.

3. The in-wheel motor drive device according to claim 2, further comprising:

a case that includes a first cylinder portion that accommodates the speed reducing mechanism and a portion of the output shaft, and is formed into a cylindrical shape around the first axis, and a second cylinder portion that accommodates the rotating electric machine, and is formed into a cylindrical shape around the second axis and such that respective outer walls of the first cylinder portion and the second cylinder portion partially overlap, wherein the second cylinder portion is disposed offset toward one side with respect to a vertical line perpendicular at the first axis to a horizontal line that passes through the first axis, and the case further includes, on an outer surface on the other side with respect to the vertical line, a caliper fixing portion that fixes the caliper.

4. The in-wheel motor drive device according to claim 3, further comprising:

a case that includes a first cylinder portion that accommodates the speed reducing mechanism and a portion of the output shaft, and is formed into a cylindrical shape around the first axis, and a second cylinder portion that accommodates the rotating electric machine, and is formed into a cylindrical shape around the second axis and such that respective outer walls of the first cylinder portion and the second cylinder portion partially overlap, wherein the second cylinder portion is disposed offset toward one side with respect to a vertical line perpendicular at the first axis to a horizontal line that passes through the first axis, and the case further includes, on the one side with respect to the vertical line and lower than the second cylinder portion, a suspension fixing portion that is fixed to a suspension device.

5. The in-wheel motor drive device according to claim 4, wherein the case includes a case main body that includes a bearing support portion that supports a bearing that rotatably supports the output shaft, accommodates at least the rotating electric machine and the speed reducing mechanism, and opens toward a side in the axial direction opposite from the bearing support portion, and a cover member that closes the opening of the case main body, wherein the suspension fixing portion is provided integrally extending from the case main body.

6. The in-wheel motor drive device according to claim 3, further comprising:

a case that accommodates at least the rotating electric machine and the speed reducing mechanism, wherein the case is fixed to a joining portion of a suspension device that passes below the case and joins to a bearing that rotatably supports the output shaft.

7. The in-wheel motor drive device according to claim 6, wherein the second axis on which the rotating electric machine is provided is disposed higher than the first axis.

8. The in-wheel motor drive device according to claim 7, wherein the speed reducing mechanism is disposed parallel on the first axis to the bearing that rotatably supports the output shaft.

9. The in-wheel motor drive device according to claim 8, wherein the transmission mechanism includes a first rotating body that is disposed on the first axis and drive-coupled to the speed reducing mechanism, a second rotating body that is disposed on the second axis and disposed offset toward a side of the first rotating body opposite from an output shaft side thereof in the axial direction, and drive-coupled to the rotating electric machine, and a counter member that is disposed on an axis parallel to the first axis and the second axis, disposed at a position that does not overlap with an outer diameter of the rotating electric machine, disposed in a radial cross section perpendicular to the first rotating body and the second rotating body so as to span between the first rotating body and the second rotating body, and drive-coupled to the first rotating body and the second rotating body.

10. The in-wheel motor drive device according to claim 9, wherein the transmission mechanism further includes an idler gear that is disposed on a third axis parallel to the first axis and the second axis and meshes with the second rotating body, and the counter member is disposed on a fourth axis parallel to the first axis and the second axis, and meshes with the first rotating body and the idler gear at different positions in the axial direction.

11. The in-wheel motor drive device according to claim 1, further comprising:

a case that includes a first cylinder portion that accommodates the speed reducing mechanism and a portion of the output shaft, and is formed into a cylindrical shape around the first axis, and a second cylinder portion that accommodates the rotating electric machine, and is formed into a cylindrical shape around the second axis and such that respective outer walls of the first cylinder portion and the second cylinder portion partially overlap, wherein the second cylinder portion is disposed offset toward one side with respect to a vertical line perpendicular at the first axis to a horizontal line that passes through the first axis, and the case further includes, on the one side with respect to the vertical line and lower than the second cylinder portion, a suspension fixing portion that is fixed to a suspension device.

12. The in-wheel motor drive device according to claim 2, further comprising:

a case that includes a first cylinder portion that accommodates the speed reducing mechanism and a portion of the output shaft, and is formed into a cylindrical shape around the first axis, and a second cylinder portion that accommodates the rotating electric machine, and is formed into a cylindrical shape around the second axis and such that respective outer walls of the first cylinder portion and the second cylinder portion partially overlap, wherein the second cylinder portion is disposed offset toward one side with respect to a vertical line perpendicular at the first axis to a horizontal line that passes through the first axis, and the case further includes, on the one side with respect to the vertical line and lower than the second cylinder portion, a suspension fixing portion that is fixed to a suspension device.

13. The in-wheel motor drive device according to claim 11, wherein the case includes a case main body that includes a bearing support portion that supports a bearing that rotatably supports the output shaft, accommodates at least the rotating electric machine and the speed reducing mechanism, and opens toward a side in the axial direction opposite from the bearing support portion, and a cover member that closes the opening of the case main body, wherein the suspension fixing portion is provided integrally extending from the case main body.

14. The in-wheel motor drive device according to claim 12, wherein the case includes a case main body that includes a bearing support portion that supports a bearing that rotatably supports the output shaft, accommodates at least the rotating electric machine and the speed reducing mechanism, and opens toward a side in the axial direction opposite from the bearing support portion, and a cover member that closes the opening of the case main body, wherein the suspension fixing portion is provided integrally extending from the case main body.

15. The in-wheel motor drive device according to claim 1, further comprising:

a case that accommodates at least the rotating electric machine and the speed reducing mechanism, wherein the case is fixed to a joining portion of a suspension device that passes below the case and joins to a bearing that rotatably supports the output shaft.

16. The in-wheel motor drive device according to claim 2, further comprising:

a case that accommodates at least the rotating electric machine and the speed reducing mechanism, wherein the case is fixed to a joining portion of a suspension device that passes below the case and joins to a bearing that rotatably supports the output shaft.

17. The in-wheel motor drive device according to claim 5, wherein the second axis on which the rotating electric machine is provided is disposed higher than the first axis.

18. The in-wheel motor drive device according to claim 1, wherein the second axis on which the rotating electric machine is provided is disposed higher than the first axis.

19. The in-wheel motor drive device according to claim 1, wherein the speed reducing mechanism is disposed parallel on the first axis to the bearing that rotatably supports the output shaft.

20. The in-wheel motor drive device according to claim 1, wherein the transmission mechanism includes a first rotating body that is disposed on the first axis and drive-coupled to the speed reducing mechanism, a second rotating body that is disposed on the second axis and disposed offset toward a side of the first rotating body opposite from an output shaft side thereof in the axial direction, and drive-coupled to the rotating electric machine, and a counter member that is disposed on an axis parallel to the first axis and the second axis, disposed at a position that does not overlap with an outer diameter of the rotating electric machine, disposed in a radial cross section perpendicular to the first rotating body and the second rotating body so as to span between the first rotating body and the second rotating body, and drive-coupled to the first rotating body and the second rotating body.

* * * * *